US008149519B2

(12) United States Patent
Yamanashi

(10) Patent No.: US 8,149,519 B2
(45) Date of Patent: Apr. 3, 2012

(54) HIGH-SPEED ZOOM LENS

(75) Inventor: Takanori Yamanashi, Woodlands Hills, CA (US)

(73) Assignee: Panavision International, L.P., Woodland Hills, CA (US)

( * ) Notice: Subject to any disclaimer, the term of this patent is extended or adjusted under 35 U.S.C. 154(b) by 74 days.

(21) Appl. No.: 12/843,815

(22) Filed: Jul. 26, 2010

(65) Prior Publication Data

US 2012/0019930 A1    Jan. 26, 2012

(51) Int. Cl.
*G02B 15/14*    (2006.01)
*G02B 9/34*    (2006.01)
*G02B 9/14*    (2006.01)

(52) U.S. Cl. ........ 359/690; 359/684; 359/686; 359/772; 359/785; 359/786; 359/787; 359/788

(58) Field of Classification Search .................. 359/684, 359/686, 687, 689, 690, 754, 771–774, 776, 359/784–788
See application file for complete search history.

(56) References Cited

U.S. PATENT DOCUMENTS

| | | | |
|---|---|---|---|
| 3,481,664 A | 12/1969 | Takano | |
| 3,598,476 A | 8/1971 | Merigold | |
| 4,240,697 A | 12/1980 | Takano | |
| 4,368,955 A | 1/1983 | Masson | |
| 4,815,829 A | 3/1989 | Yamanashi et al. | |
| 4,991,942 A | 2/1991 | Fujibayashi et al. | |
| 5,103,343 A | 4/1992 | Sekita | |
| 5,257,134 A | 10/1993 | Sugawara | |
| 5,600,490 A | 2/1997 | Sugawara et al. | |
| 5,717,527 A | 2/1998 | Shibayama | |
| 5,793,531 A | 8/1998 | Shibayama | |
| 5,920,435 A | 7/1999 | Shibayama | |
| 7,123,421 B1 | 10/2006 | Moskovich et al. | |
| 7,239,455 B2 * | 7/2007 | Suzuki | 359/745 |

OTHER PUBLICATIONS

Matsui, Y. et al. (1993). "Practical Aberration Theory," Chapter 3 in *Fundamentals of Practical Aberration Theory: Fundamental Knowledge and Technics for Optical Designers*, World Scientific Publishing Co. Pte. Ltd., pp. 66-69, 74-77.

Zuegge, H. et al. (Jun. 26, 1997). "A Complete Set of Cinematographic Zoom Lenses and Their Fundamental Design Considerations," *Proceedings of the 22$^{nd}$ Optics Symposium*, Japan, 22:13-16. (6 pages total).

* cited by examiner

*Primary Examiner* — Jack Dinh
(74) *Attorney, Agent, or Firm* — Connolly Bove Lodge & Hutz LLP

(57) ABSTRACT

Embodiments of an optical zoom lens system may comprise three lens groups with a PNP power sequence. The first lens group may vary focus. The second and third lens groups may be movable to vary magnification during zoom. The first lens group may include three lens subgroups with an NNP power sequence: a stationary first lens subgroup, a second lens subgroup including a movable lens element, and a stationary or movable third lens subgroup. The second lens subgroup may include two parts, which may be movable at different rates of travel to vary focus. One part may include the movable lens element. Lens elements of the first lens group may be movable according to different focus movement plans. In the first lens group, lens element movement and lens element power may contribute to provide low focus breathing over the entire zoom range. The F-number may be F/2.8 or less.

26 Claims, 20 Drawing Sheets

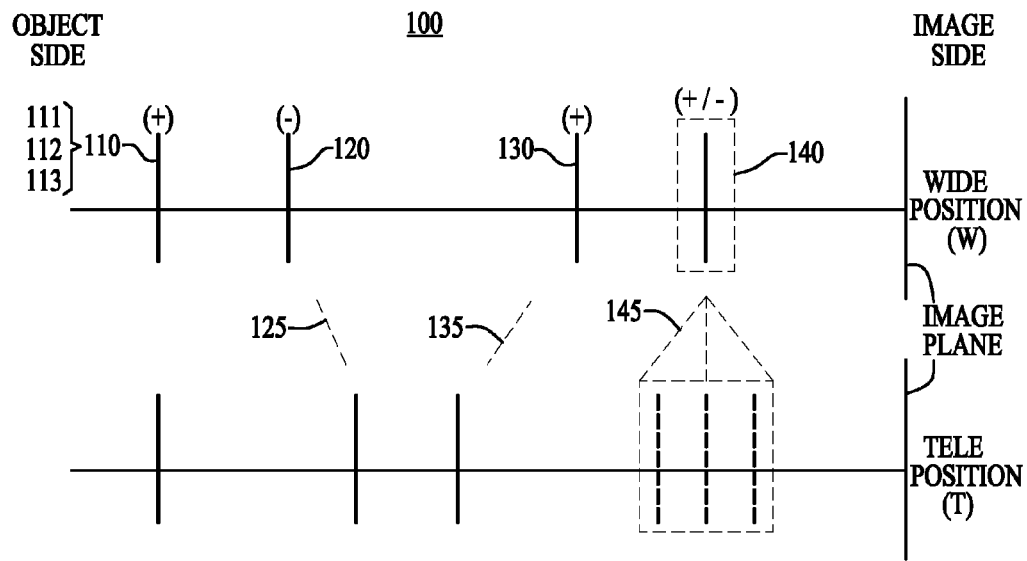
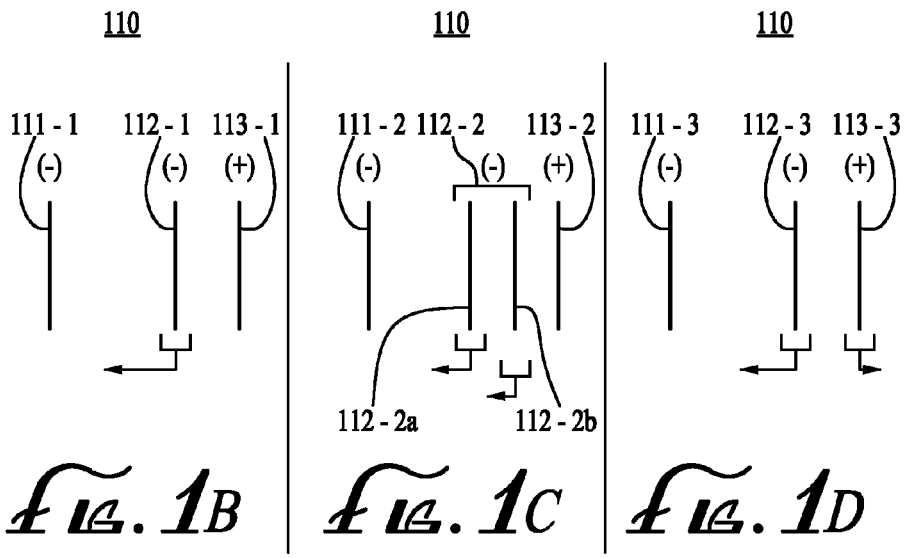

HIGH-SPEED ZOOM LENS

FIELD

This relates to optical high-speed zoom lens systems. Embodiments of the high-speed zoom lens system may be particularly advantageous for image capture devices in cinematography applications.

BACKGROUND

Zoom lens systems have been used in a variety of applications, such as image capture devices for capturing still images or moving images. Examples of still images may include static pictures of landscapes, wildlife, or sports. Examples of moving images may include motion pictures of movies, film, and video. Although zoom lens techniques are known for all of these various applications, differences in these applications may lead to differences in the development and structure of zoom lens systems for different applications. In other words, one zoom lens system may be more suitable than another for a certain application.

Focus Breathing

By way of example, considerations that may be significant for capturing moving images may be negligible or non-existent for capturing still images. One such consideration may be the effect of focus breathing. When the focus of a lens system is adjusted, lens elements for focusing may move. This movement may result in a change in the total focal length of the lens system. As total focal length may be related to zooming, the field of view (or angle of view) may change, similar to a zooming effect. For instance, as one changes the focus back and forth between the foreground to the background, the field of view may change such that it appears to be "breathing" (or zooming in and out) during the focus adjustment in real-time. Although these changes in the field of view may actually result from adjustments in focus settings, the changes may appear to be results from adjustments in zoom settings, even when zoom settings have not been adjusted.

In an example from a cinematography application, such as a movie scene, one may want to change focus from one actor to another actor during a conversation in the same field of view without changing the field of view, i.e., without focus breathing. Significant changes in the field of view during multiple focus adjustments may be undesirably distracting to a viewing audience.

When capturing a particular still image, one may be concerned about using a particular field of view for that particular still image capture, not about maintaining the same particular field of view for the next still image capture. With respect to this particular still image capture, the next still image capture may be completely unrelated in field of view. In other words, unlike capturing moving images, capturing still images may generally involve little or no concern about maintaining the same field of view for different still image captures with different focus settings. Furthermore, focus breathing may be detected during focus changes in real-time capturing of motion pictures, but effects during real-time focus changes may be ignored or even often unnoticed when capturing still images. Accordingly, capturing still images may generally involve little or no concern related to focus breathing.

Even when capturing moving images, focus breathing may still be a minor or negligible concern in some applications. For instance, a user of an ordinary video camcorder may be satisfied with an image capture device having a simpler optical lens system that does not include such precise controls for field of view and focusing.

Lens Shade

In addition to focus breathing, cinematography applications may also involve other considerations. For example, in order to provide high-quality image capturing for professional-level motion pictures, it is generally desirable to remove or reduce unwanted effects on the captured image. Lighting may be a crucial variable to control, and collecting light from unintended light sources may lead to some generally undesirable effects, such as ghost images.

In order to limit entrance of light into a camera lens system from unintended sources, such as unwanted sunlight, a lens shade (e.g., a matte box) may be attached to the outer lens barrel at the front of a lens system in a cinematography application. If the lens shade is too short, unwanted light may enter the lens system. If the lens shade is too long, too much light may be blocked, and the lens shade itself may enter the field of view. A lens system with a fixed front lens element may lead to fewer or no adjustments of the lens shade size and/or position. A lens system with a moving front lens element may require many adjustments of the lens shade size and/or position in order to compensate for the different positions of the moving front lens element. Therefore, for applications in cinematography, it may be highly advantageous to employ a lens system with a fixed front lens element that is stationary during functions that may involve moving lens elements, such as zoom and focus. Conversely, it may be uncommon to practice applications in cinematography with a lens system having a moving front lens element.

Lens Speed

For cinematography applications, lens speed may be another common consideration. Lens speed can be correlated to the maximum aperture of a lens, which can be quantified in terms of an F-number F/#. Aperture size and F-number are inversely related, so the maximum aperture would correspond to a minimum F-number. Also, a lens with a larger aperture would have a smaller F-number, and vice versa. For example, lens A having a larger maximum aperture (smaller minimum F-number) will be able to pass through more light to the image capturing film (or sensor) than lens B having a smaller maximum aperture (larger minimum F-number). Lens A would enable a faster shutter speed than lens B. Therefore, lens A (with a smaller minimum F-number) would be "faster" than lens B (with a larger minimum F-number). In other words, a larger aperture leads to a "faster" lens.

A common concern in cinematography applications is shooting pictures under lower illumination environments. For such environments in dim lighting, higher lens speeds are generally preferred. For example, a lens of relatively high speed may have an F-number of 2.8 or smaller.

In some applications, it may be desirable to attain image captures with specific areas that are out-of-focus, or bokeh. Bokeh can occur in an image area that is outside the depth of field. Faster lenses can have a shallower depth of field, which can be useful for providing images with bokeh. Thus, a high-speed lens may be required to attain images with a desirable amount of bokeh.

A similar parameter used in cinematography is T-number T/#. T-number is like F-number but additionally adjusted for the amount of light transmitted through the lens in actual usage. For instance, at a given lens aperture, the T-number will equal the F-number if the lens has 100% transmission, i.e., no loss of light. However, as light passes through a lens, there is loss (e.g., through absorption by the lens). Therefore, the T-number will be larger than the F-number. For cinematography applications, a minimum T-number smaller than 2.8 may be preferred. The use of T-number is relatively uncommon outside of cinematography.

Prior Art Zoom Lenses

Although zoom lens systems are known for many various applications, not all zoom lens systems are applicable for all these various applications. For example, a given zoom lens system may be particularly designed for a certain application, but not suitable for another application. Additionally, combining techniques of different zoom lens systems may involve complicated considerations and may not be simple to realize.

U.S. Pat. No. 4,815,829 to Yamanashi et al. demonstrates a telephoto zoom lens system. However, the zoom function of this system operates by moving the front lens element, i.e., the lens element at the front end of the system. In view of the lens shade consideration above with respect to a moving front lens element, this system may not be preferred for use in cinematography applications with a lens shade. Furthermore, the zoom lens examples of Yamanashi et al. have F-numbers of F/3.5 or greater, which are much slower than the relatively higher speed zoom lenses of cinematography applications, such as those with F-numbers of F/2.8 or less. In contrast, U.S. Pat. No. 7,123,421 to Moskovich et al. discloses a zoom lens system for cinematography with an F-number of F/2.7, a zoom lens with relatively high speed.

U.S. Pat. No. 4,991,942 to Fujibayashi et al. discloses a zoom lens with a first lens group that is stationary during zooming. However, this first lens group moves during focusing. Such lens group movement during focusing may contribute to a focus breathing effect. Even though this zoom lens system may be used in a video camera, there is no discussion of any technique to address the effect of focus breathing. Additionally, as the front lens element may be a moving lens element, this system may be not recommended for use in cinematography applications with a lens shade.

U.S. Pat. No. 3,598,476 to Merigold exemplifies a zoom lens with a stationary front lens element that is part of a lens group for focusing. Merigold's zoom lens functions with lens groups that move according to a particular movement plan during zooming. In contrast, the zoom lens system of Fujibayashi et al. functions with lens groups that move according to a different movement plan during zooming. This is not a trivial difference.

In the field of zoom lens systems, it is generally understood that a functional system is a complex combination of many interrelated variables (e.g., optical power, lens position, lens movement, lens size, lens thickness, lens material, number of lens elements, lens surface shaping). Changes in one of the variables generally alter the functioning of the original system (e.g., zoom operation). In order to maintain a system that functions appropriately (e.g., according to the principles of the original zoom design), changes in one of the variables generally lead to compensating changes in one or more of the other variables.

Accordingly, experimentation with any variables to incorporate the teachings of a first zoom lens system into a second zoom lens system could lead to other unintended adverse effects in the second zoom lens system. Such adverse effects may result in changing the fundamental operation of the second zoom lens system.

U.S. Pat. No. 5,717,527 to Shibayama teaches a zoom lens system with three lens groups. This zoom lens system appears to be directed to macro photography, or very close-up photography. In an embodiment, the front lens element may be stationary during zooming, but movable during focusing. However, there is no discussion of any technique to address the effect of focus breathing. Macro photography often involves capturing still images, so there may be little or no concern for focus breathing.

Also, in macro photography, the distance from the lens to the object is often very small, and the image on the image capture medium (e.g., film or digital sensor) is similar in size to the object being photographed. A zoom lens, as in Shibayama, may be designed to be optimized for such object distances and sizes. Thus, it may be unsuitable or not optimized for cinematography applications, which generally involve objects that are much farther away from a lens (e.g., ~1 m or greater) or that are much larger in size.

Furthermore, the zoom lens examples of Shibayama have F-numbers that are F/4.0 or greater, which are much slower than the relatively higher speed zoom lenses of cinematography applications, such as those with F-numbers of F/2.8 or less. In contrast, U.S. Pat. No. 7,123,421 to Moskovich et al. discloses a zoom lens system for cinematography with an F-number of F/2.7, a zoom lens with relatively high speed.

An article, "A complete set of cinematographic zoom lenses and their fundamental design considerations," by Zuegge et al. provides teachings for zoom lenses for cinematography applications. Zuegge et al. mentions considerations of focus breathing, a fixed overall length in view of a compendium hood, and high-speed zoom lenses. However, the zoom lenses of Zuegge et al. are specific designs that do not cover all solutions for addressing these considerations.

SUMMARY

Embodiments of the invention relate to optical high-speed zoom lens systems. Embodiments of the high-speed zoom lens system may be particularly advantageous for image capture devices in cinematography applications.

Embodiments of the invention may comprise three lens groups with a power sequence of positive-negative-positive, or PNP. The first lens group may vary the image focus. The second and third lens groups may be movable to vary the image magnification during zoom.

The first lens group may include three lens subgroups with a power sequence of NNP. The first lens subgroup may be stationary. The first lens element of the first lens subgroup may constitute a fixed front lens element of a zoom lens system. This fixed front lens element may be advantageous for usage with a lens shade, which may be useful and common in cinematography applications.

The second lens subgroup may include a movable lens element. The second lens subgroup may include two parts, which may be movable at different rates of travel to vary the image focus. One of the two parts may include the movable lens element.

In some embodiments, the third lens subgroup may be stationary. In other embodiments, the third lens subgroup may be movable to vary the image focus.

Lens elements of the first lens group may be movable according to different focus movement plans.

Lens element movement in the first lens group and lens element power in the first lens group may contribute to provide low focus breathing over the entire zoom range of the system. Low focus breathing may lead to small changes in field of view, which may be desirable in cinematography applications.

Embodiments of the invention may comprise a zoom lens system having an F-number of F/2.8 or less, which may provide a relatively high-speed lens. For applications involving lower illumination or images with bokeh, a high-speed lens may be required. Cinematography may include such applications.

Embodiments of the invention may also comprise additional lens groups. For instance, a fourth lens group may be used to flatten the image.

BRIEF DESCRIPTION OF THE DRAWINGS

FIG. 1A illustrates basic principles of an inventive embodiment.

FIGS. 1B-1D illustrate three different movement plans for focusing.

DETAILED DESCRIPTION

Figure 1E:
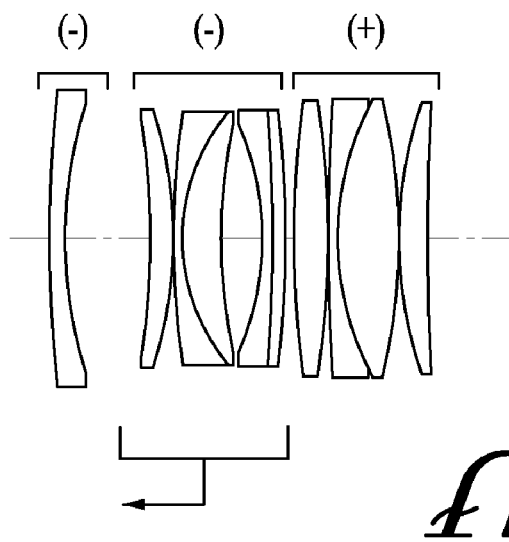
FIGS. 1E-1G illustrate example embodiments with the three different movement plans of FIGS. 1B-1D.

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Exemplary Basic Principles

Embodiments of the invention relate to optical high-speed zoom lens systems. Embodiments of the high-speed zoom lens system may be particularly advantageous for image capture devices in cinematography applications. However, embodiments of the invention are not limited to this usage in cinematography. For example, other usages may include capturing still images and non-cinematographic applications.

FIG. 1A illustrates basic principles of an inventive embodiment 100. System embodiment 100 may include three lens groups: lens group 110 with positive power, lens group 120 with negative power, and lens group 130 with positive power. From the object side to the image side, the power sequence of these three lens groups 110, 120, and 130 may be described as PNP. Lens group 110 may include three lens subgroups 111, 112, and 113.

Lens group 140 may be an optional fourth lens group that can operate as a field flattener to flatten the image. Lens group 140 may have negative or positive power. Lens group 140 may include a singlet, a doublet, or a triplet. Lens group 140 may be fixed or movable. From the object side to the image side, the power sequence of the four lens groups 110, 120, 130, and 140 may be described as PNP(P or N). Movement lines 145 are intended to broadly indicate any suitable movement plan for lens group 140, including monotonic and non-monotonic movement plans. Movement plan lines 145 are not intended to show the specific movement details (e.g., exact movement rate, exact position during movement) of lens group 140.

During zooming, lens group 110 may be stationary, and lens groups 120 and 130 may be movable. Lens groups 120 and 130 may move for varying magnification, i.e., zooming. Movement plan lines 125 and 135 are intended to broadly indicate any suitable movement plan for lens groups 120 and 130. The movement of lens group 120 may be monotonic. For example, from the wide (W) position to the tele (T) position, any movement of lens group 120 is toward the image side, and vice versa. The movement of lens group 130 may be monotonic or non-monotonic. Movement plan lines 125 and 135 are not intended to show the specific movement details (e.g., exact movement rate, exact position during movement) of lens groups 120 and 130. Following examples show specific embodiments with additional movement details. In embodiments with lens group 140, lens group 140 may also be movable during zooming.

During zooming, the focal plane (i.e., the location where the image focuses) may move if there is no compensation for keeping the focal plane stationary. Movement of lens group 120 or lens group 130 or both lens groups 120 and 130 can provide this compensation. In embodiments with lens group 140, lens group 140 may also be movable to contribute to this compensation.

In some embodiments, lens group 120 mainly varies the zoom magnification. For each zoom position of lens group 120, lens group 130 can provide a compensating function for keeping the image position stationary. At the same time, lens group 130 can vary the zoom magnification. The divergent marginal ray from lens group 120 can reach a front subgroup of lens group 130. The spherical aberrations can be well-corrected within this front subgroup.

FIG. 1A shows the positioning of the lens groups of system 100 at the wide (W) position and the tele (T) position. FIG. 1A also shows the general movement plan of the lens groups as system 100 progresses from the wide-end (W) zoom position to the telephoto-end (T) zoom position: lens group 110 may be stationary, lens groups 120 may move monotonically toward the image side, and lens group 130 may move toward the object side, monotonically or non-monotonically. In embodiments with lens group 140, lens group 140 may be stationary or movable, monotonically or non-monotonically.

The focus function and the zoom function may be independent from each other. For instance, the movement of focusing lens elements may be independent of any movement of zooming lens elements. For a specific example, lens elements of lens group 110 may move to adjust the focus while the zoom does not change. Similarly, lens elements of lens groups 120 and 130 (and optional lens group 140) may move to adjust the zoom while the focus does not change. Accordingly, embodiments may include a true zoom lens (or parfocal lens), which keeps the same focus even when the zoom positions (or focal lengths) change.

Various embodiments may operate with different focal lengths. A following example shows a minimum focal length of 35.05 mm, but other embodiments may include a minimum focal length less than 35.05 mm. A following example shows a maximum focal length of 122 mm, but other embodiments may include a maximum focal length greater than 122 mm. Minimum object distance may be around 900 mm or 3 feet or greater. Variations may have a zoom ratio of about 2 to 3 times magnification, which can be used in a compact zoom lens for cinematography cameras. As the zoom ratio increases (e.g., greater than 3×), the movement plan of lens group 130 may include a turning point and be non-monotonic.

Various embodiments may employ different lens element configurations, as exemplified by the following embodiments in FIGS. 1E-1G, 2A, 3A, and 4A. Moreover, embodiments of the invention are not limited to these specific lens element configurations. For instance, instead of a cemented doublet, a suitable combination of one or more of the following may be used: an air-spaced doublet, a singlet, and a set of multiple lens elements. A suitable combination would maintain appropriate functioning of the original embodiment (e.g., according to principles of the original zoom design).

For cinematography applications, various embodiments may also address additional concerns, as in the following exemplary considerations. The F-number may be constant from the wide-end to the telephoto-end. The zoom lens may be high-speed (e.g., F-number less than 2.8). The overall length of the zoom lens system 100 may be constant during zoom and focus movements of the lens groups 110, 120, and 130 (and optionally 140). In a portable (e.g., hand-held) camera embodiment with a matte box, this overall length may be fixed due to lens shade considerations. The T-number may also be less than 2.8. Moreover, various embodiments may address focus breathing concerns. Furthermore, for film cameras and digital cameras, the chromatic aberrations may be well corrected within certain wavelength ranges. Embodiments of the invention may address any combination of one or more of these exemplary considerations.

Design Considerations for High-Speed Zoom Lenses

A high-speed zoom lens may be empirically recognized as having an F-number smaller than 2.8. A common application for such high-speed zoom lenses may be shooting pictures in environment with relatively low illumination. A more technical discussion of lens speed follows.

In general, F-number is defined by the entrance pupil diameter (EPD) and the effective focal length (EFL) at object distance infinity. F-number is a dimensionless number.

$$F\text{-number}=EFL/EPD \text{ (object distance infinity)}$$

When the object is not at a far distance from the lens (i.e., finite object distance), a "working" or "effective" F-number (Fe-number) may be used. Fe-number may be defined by the F-number and the magnification (m) of the lens for an object at finite object distance.

$$Fe\text{-number}=(1-m)*F\text{-number}$$

Based only on these simple equations, it may appear that designing a high-speed zoom lens would simply involve a low F-number. For instance, increasing lens size may lead to a larger aperture, which may lead to a larger entrance pupil diameter (EPD). For a constant effective focal length (EFL), a larger EPD would lead to a smaller F-number and a "faster" lens. However, a real lens has actual real-world parameters, such as lens weight, size, and production costs. Increasing EPD may increase the lens weight and size and length, which may lead to inconveniences of a heavier and larger camera. For instance, hand-held camera operations may become difficult with a heavier lens. Increasing lens size may also lead to higher production costs.

Additionally, a real optical system may be generally bound by practical limitations of real lens elements, thus limiting the optical performance. Such limitations may lead to lower quality images. These limitations may be understood in terms of phenomena known as optical aberrations.

For instance, F-number can be related to optical aberrations. When the effective focal length EFL is constant, F-number has a directly inverse relationship to the entrance pupil diameter EPD. EPD may strongly affect the optical aberration types of spherical aberration and coma. A smaller F-number would indicate a larger EPD, which would lead to greater effects of spherical aberration and coma. Therefore, a smaller F-number may increase the difficulty of correcting such optical aberrations. If the effects of optical aberrations are too great, the optical performance of the lens system may be unacceptable with the smaller F-number. Accordingly, modifying an existing zoom lens system to have a smaller F-number (i.e., "faster" lens) may be difficult to achieve without significant effects of optical aberrations, such as spherical aberration and coma.

Moreover, spherical aberration and coma are only two examples of optical aberration affected by F-number. Other types of optical aberration affected by F-number may include astigmatism and field of curvature. Efforts to achieve a high-speed lens system may also involve appropriate consideration of these types of optical aberrations, as well.

Furthermore, although increasing F-number may help correct optical aberrations, it may also increase diffraction. Diffraction is another optical phenomenon that can degrade image quality.

Therefore, a particular lens design may have an optimum F-number (or lens speed or aperture size) that balances the effect of optical aberrations and the effect of diffraction. Accordingly, undue experimentation may be involved when modifying an existing zoom lens system with an original and optimum F-number to have a different F-number. Without sufficient considerations for these effects, the modified zoom lens system with the different F-number may have unacceptable optical performance (e.g., low image quality, images out of focus, blurred images) due to optical aberrations or diffraction. Therefore, careful consideration of all of these effects may be involved in the design of a high-speed zoom lens. Corrective measures may be available to counter some of these effects, but such corrective measures may be too costly or impractical if the amounts of these effects are too great.

Some of these image degrading phenomena may be quantified in equations that describe different types of optical aberration. Examples of such equations may be found in known references, such as *Fundamentals of Practical Aberration Theory: Fundamental Knowledge and Technics for Optical Designers* by Y. Matsui et al., which is herein incorporated by reference in its entirety for all purposes.

For instance, as F-number=EFL/EPD, a lower F-number may have a larger EPD. A larger EPD is correlated to a larger paraxial marginal ray height h. According to optical aberration equations, a larger h value could lead to greater effects of spherical aberration, coma, astigmatism, and field of curvature. Therefore, properly designing a high-speed zoom lens would involve appropriate consideration of the image-degrading effects of these aberrations.

Focusing Techniques

FIGS. 1B-1D illustrate three different movement plans I, II, and III for focusing by lens group 110 of FIG. 1A. Lens group 110 may comprise three lens subgroups 111, 112, and 113. The first lens subgroup 111 may have negative power. The second lens subgroup 112 may have negative power. The third lens subgroup 113 may have positive power. From the object side to the image side, the power sequence of the three lens subgroups may be described as NNP. The combined power of the three lens subgroups may be positive. FIGS. 1B-1D show the lens subgroups in the focus position of object distance at infinity.

In all three focus movement plans I-III, the focus function and the zoom function may be independent from each other. For instance, the movement of focusing lens elements may be independent of any movement of zooming lens elements.

In all three focus movement plans I-III, the first lens subgroup (111-1, 111-2, 111-3) may be stationary during zooming and focusing. In embodiments where the first lens subgroup is at the front of the zoom lens system, the overall length of the zoom lens system 100 may be constant, even during zooming and focusing. As the front lens element may be stationary, one may understand the focusing of all three focus movement plans I-III as a type of internal focusing.

This first lens subgroup may also contribute to increasing the back focus of the system (i.e., increasing the distance between the rear lens element and the image capturing film or sensor), which could provide space for additional components (e.g., a rotating mirror in an SLR configuration). Moreover, this first lens subgroup may decrease the travel distance for other movable lens elements within lens group 110.

In all three focus movement plans I-III, the lens elements of the second lens subgroup (112-1, 112-2a and 112-2b, 112-3) may be movable during focusing. In focus movement plan I of FIG. 1B, lens subgroup 112-1 may be movable in between stationary lens subgroups 111-1 and 113-1. During progression from one end focus position of object distance at infinity to the other end focus position of minimum object distance, lens subgroup 112-1 may move monotonically toward the object side.

In focus movement plan II of FIG. 1C, lens subgroup 112-2 may comprise two parts: lens subgroup parts 112-2a and 112-2b, which may be movable in between stationary lens subgroups 111-2 and 113-2. During progression from one end focus position of minimum object distance, both lens subgroup parts 112-2a and 112-2b may move monotonically toward the object side. As both parts move toward the object side, the movement rate of the two parts may be different, which may be called floating. For instance, part 112-2a may travel a greater total distance during progression between the two end focus positions than part 112-2b. Thus, part 112-2a may travel "faster" than part 112-2b. The combined power of the two parts may be negative.

In focus movement plan III of FIG. 1D, both lens subgroups 112-3 and 113-3 may be movable. During progression from one end focus position of object distance at infinity to the other end focus position of minimum object distance, lens subgroups 112-3 and 113-3 may move in different directions; lens subgroup 112-3 may move monotonically toward the object side, and lens subgroup 113-3 may move monotonically toward the image side.

In cases where the third subgroup is sensitive to tilting or shifting, the third lens subgroup may be stationary, such as lens subgroup 113-1 in focus movement plan I or lens subgroup 113-2 in focus movement plan II.

Embodiments with focus movement plans I-III may be well-suited for applications with lens shades due to a stationary first lens subgroup. In embodiments where the stationary first lens subgroup includes a stationary front lens element, the overall length of the zoom lens system 100 may be constant, even during zooming and focusing. Therefore, using such a lens system may involve fewer or no adjustments of a lens shade size and/or position.

Embodiments with focus movement plans I-III may be well-suited for applications where focus breathing is a significant concern. Focus breathing may be described in terms of the amount of change in the field of view (or angle of view) as a lens system progresses between the two end focus positions of maximum object distance and minimum object distance:

Focus breathing (%)=$(W_{inf} - W_{min})/W_{inf}$

Field of view at infinity is $W_{inf}$. Field of view at minimum object distance is $W_{min}$. Some embodiments of the invention may achieve 5% or less change (positive or negative) in the field of view.

Low focus breathing may be accomplished through various techniques. Some techniques employed in embodiments with focus movement plans I-III may include short travel distances of lens subgroups in lens group 110 and sufficient optical power of moving lens elements of lens group 110.

As discussed above, the field of view (FOV) may change due to change in the total focal length. Total focal length can change due to the movement of focusing lens elements. If the movement is small, the FOV change may also be small. Embodiments of focus movement plans I-III may include short travel distances of lens subgroups in lens group 110 to contribute to low focus breathing.

Also, the optical power of focusing lens elements may affect the lengths of travel distances of focusing lens elements. If the optical power of focusing lens elements is weak, then the focusing lens elements may have to travel longer distances in order to achieve a certain amount of focus change. For the same amount of focus change, if the optical power of the focusing lens elements is strong, then the focus lens elements may have to travel shorter distances. However, if the optical power is too strong, then the effect of optical aberrations may become unacceptably high. Embodiments with focus movement plans I-III may include moving lens elements with sufficient optical power to contribute to shorter travel distances, thus contributing to low focus breathing. For example, the second lens subgroup 112 may have strong optical power.

It should be noted, however, that short travel distances do not automatically imply low focus breathing. For example, if a focusing lens element's power is very strong, the FOV change may be large even for a short travel distance.

Figure 1F:
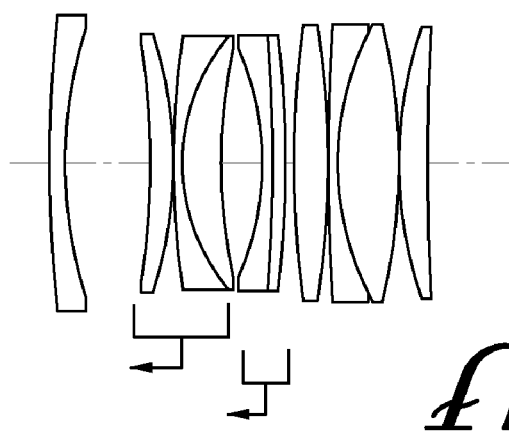
Figure 1G:
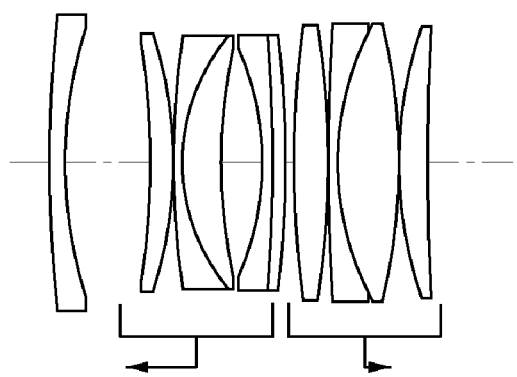

FIGS. 1E-1G illustrate example embodiments of lens group 110 with the three different movement plans of FIGS. 1B-1D. FIG. 1E illustrates an embodiment with focus movement plan I. FIG. 1F illustrates an embodiment with focus movement plan II. FIG. 1G illustrates an embodiment with focus movement plan III. The embodiments of FIGS. 1E-1G all have the same configuration of lens elements.

In each of the embodiments of FIGS. 1E-1G, the second lens subgroup includes two cemented doublets, and the third lens subgroup includes one cemented doublet. These doublets may contribute to correcting the type of optical aberration known as chromatic aberration.

Although many of the technical details above are mostly described in the context of cinematography applications, the technical details may also be advantageous in ways that are independent of cinematographic considerations.

For example, independent of the use of a lens shade, there may be other advantages for employing a fixed front lens group. For instance, a stationary first lens group may contribute to a lens system with a fixed system length. Such a lens system could be housed in a housing structure with a fixed length, which could be more stable and protective than a housing structure with a variable length.

Example Embodiments

For each following example embodiment, a representative figure provides a visual depiction of a high-speed zoom lens system. For zoom positions, the wide-end (W) position and the telephoto-end (T) position are shown. Also, the representative figure shows the focus position of object distance at infinity. Different focus positions may be shown in additional figures.

Additionally, for each following example embodiment, a table provides lens data in five columns. A row in the first column ("Surface") identifies a surface (e.g. lens element surface, dummy surface, stop). A row in the second column ("Radius of Curvature (mm)") provides the radius of a surface in mm. A row in the third column ("Thickness or Separation (mm)") provides the thickness, whether lens material or air, on the optical axis between the surface of that row and the next surface in mm. A row in the fourth column ("Ne") provides the refractive index of lens element material at the e-line (wavelength=546.1 nm). A row in the fifth column ("Ve") provides the Abbe number of lens element material at the e-line.

In the first column ("Surface"), the numbers represent the surfaces ordered from left-to-right in the representative figures of the example embodiments, i.e., from object side to image side. When two surfaces of adjacent elements have the same radius and are coincident, as in a doublet or triplet, only one surface is identified in the first ("Surface") column. Also, in the "Surface" column, "STO" identifies an adjustable iris or stop.

In the third column ("Thickness or Separation (mm)"), the term "D(_____)" indicates distance between surfaces that may be variable for different zoom positions. For each lens data table, there is a zoom position table that provides the different separation distances for different zoom positions according to different focal lengths.

In all of the lens data tables, all of the lens element surfaces are spherical. Other embodiments may include lens elements with aspherical surfaces.

Furthermore, aberration graphs are provided for each following example embodiment. These graphs indicate the effects of some optical aberrations, including longitudinal spherical aberration, astigmatism of sagittal and meridional curvatures, and distortion.

In the longitudinal spherical aberration graphs, the horizontal axis represents focus deviation in mm, and the vertical axis represents ray height in the entrance pupil. Performance for different wavelengths may be compared by plotting the different wavelengths (i.e., spectral lines) on the same graph. In the following longitudinal spherical aberration graphs, these spectral lines are shown: C (656.3 nm), d (587.6 nm), e (546.1 nm), F (486.1 nm), and g (435.8 nm).

In the astigmatism graphs, the horizontal axis represents focus deviation in mm, and the vertical axis represents field angle. In the following astigmatism graphs, both the sagittal and meridional curvatures at the e-line are shown.

In the distortion graphs, the horizontal axis represents percentage distortion, and the vertical axis represents field angle. In the following distortion graphs, the e-line is shown.

Example First Embodiment

Figure 2A:
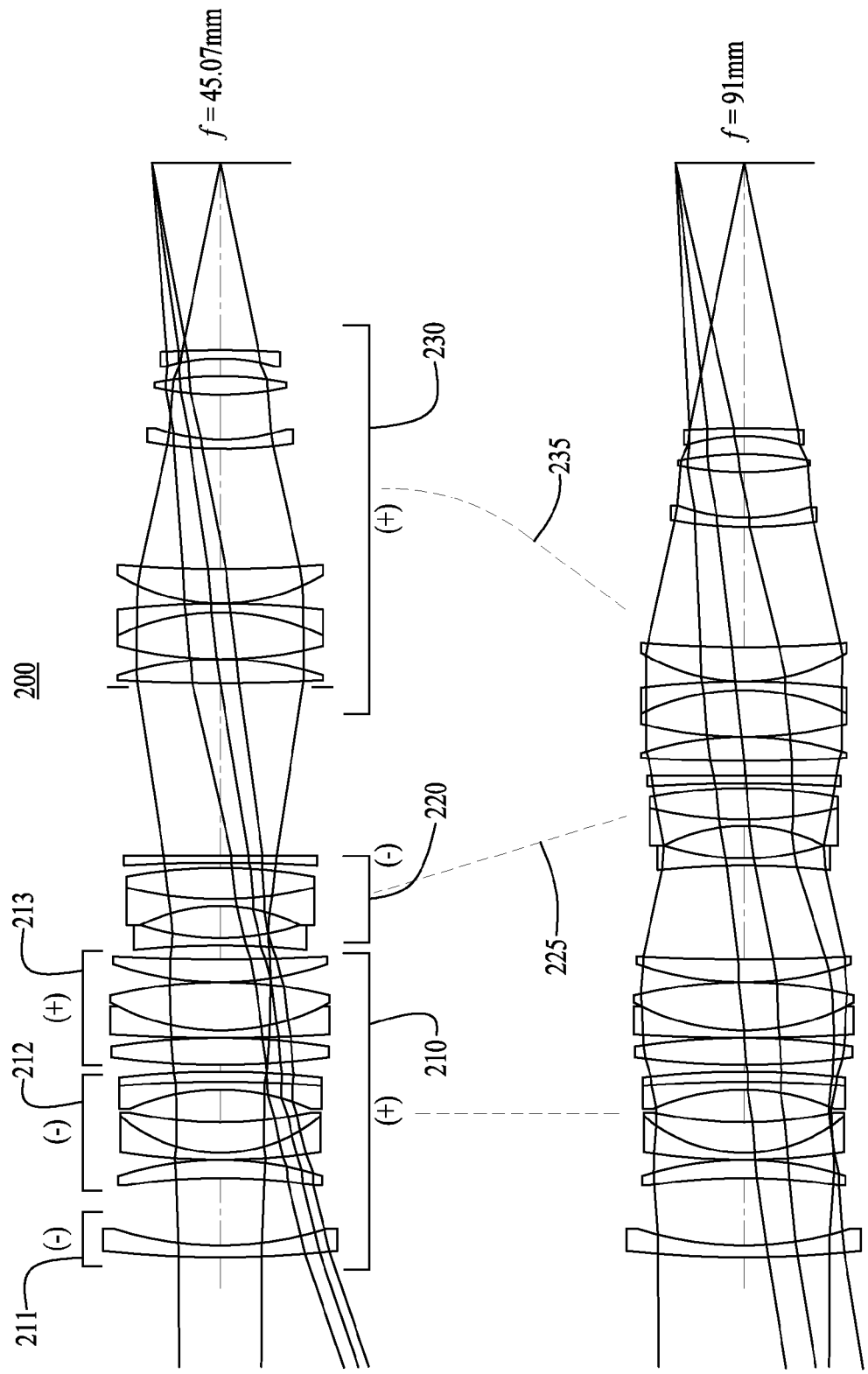
FIG. 2A illustrates a first embodiment.

FIG. 2A illustrates a first embodiment 200. From the wide-end (W) to the telephoto-end (T), the focal length ranges from 45.07 mm to 91 mm. The F-number is F/2.5. FIG. 2A shows three lens groups 210, 220, and 230 with a PNP power sequence. Lens group 210 includes three lens subgroups 211, 212, and 213 with a NNP power sequence. Lens group 210 may be stationary. Movement plan lines 225 and 235 indicate the general movement plan for zoom functions in the first embodiment. Similar reference numbers in FIGS. 2A and 1A refer to similar items.

TABLE 1A provides lens data for the first embodiment. TABLE 1B provides the various zoom positions of the wide-end zoom position, an intermediate zoom position, and the telephoto-end zoom position at three respective focal lengths (mm): 45.07, 61.4, and 91.

TABLE 1A

FIRST EMBODIMENT - LENS DATA

| Surface | Radius of Curvature (mm) | Thickness or Separation (mm) | Ne | Ve |
|---|---|---|---|---|
| 1: | 224.56391 | 2.670000 | 1.48915 | 70.10 |
| 2: | 75.94191 | 14.070000 | | |
| 3: | −125.16421 | 3.700000 | 1.85504 | 23.64 |
| 4: | −71.46367 | 0.125000 | | |
| 5: | 152.86189 | 1.520000 | 1.85649 | 32.03 |
| 6: | 32.40406 | 6.550000 | 1.85504 | 23.64 |
| 7: | 85.97383 | 6.870000 | | |
| 8: | −46.62708 | 1.730000 | 1.80642 | 34.70 |
| 9: | −244.48570 | 2.200000 | 1.81266 | 25.16 |
| 10: | −165.82221 | 1.400000 | | |
| 11: | 197.72645 | 5.600000 | 1.80811 | 46.30 |
| 12: | −150.72018 | 0.140000 | | |
| 13: | 489.96934 | 1.560000 | 1.81266 | 25.16 |
| 14: | 48.00195 | 10.300000 | 1.69401 | 54.60 |
| 15: | −95.70508 | 0.140000 | | |
| 16: | 74.09217 | 4.600000 | 1.62033 | 63.00 |
| 17: | 493.47640 | D(17) | | |
| 18: | INFINITY | 0.950000 | | |
| 19: | −173.57707 | 1.590000 | 1.70557 | 41.00 |
| 20: | 54.15513 | 6.787000 | | |
| 21: | −40.34047 | 1.510000 | 1.60520 | 65.10 |
| 22: | 79.44781 | 6.500000 | 1.85500 | 23.69 |
| 23: | −121.32492 | 1.230000 | | |
| 24: | −277.97065 | 1.750000 | 1.81266 | 25.16 |
| 25: | −1830.78335 | D(25) | | |
| STO: | INFINITY | 1.000000 | | |
| 27: | 621.53546 | 5.000000 | 1.49845 | 81.00 |
| 28: | −71.11105 | 0.180000 | | |
| 29: | 101.68810 | 9.870000 | 1.49845 | 81.00 |
| 30: | −50.21879 | 1.650000 | 1.80642 | 34.70 |
| 31: | −226.98033 | 0.195000 | | |
| 32: | 44.12738 | 7.270000 | 1.49845 | 81.00 |
| 33: | 284.21799 | 25.647000 | | |
| 34: | 89.43694 | 1.710000 | 1.72310 | 29.30 |
| 35: | 38.94768 | 9.570000 | | |
| 36: | 74.54695 | 3.770000 | 1.88815 | 40.50 |
| 37: | −71.28775 | 3.920000 | | |
| 38: | −42.02146 | 1.700000 | 1.82017 | 46.40 |
| 39: | −202.89230 | | | |

TABLE 1B

FIRST EMBODIMENT - ZOOM POSITIONS

| Location | Wide-end (W) f = 45.07 mm Separation (mm) | Intermediate f = 61.4 mm Separation (mm) | Telephoto-end (T) f = 91 mm Separation (mm) |
|---|---|---|---|
| D(17) | 1.55000 | 10.387410 | 18.80265 |
| D(25) | 35.84483 | 20.917350 | 2.17103 |

Figure 2B:
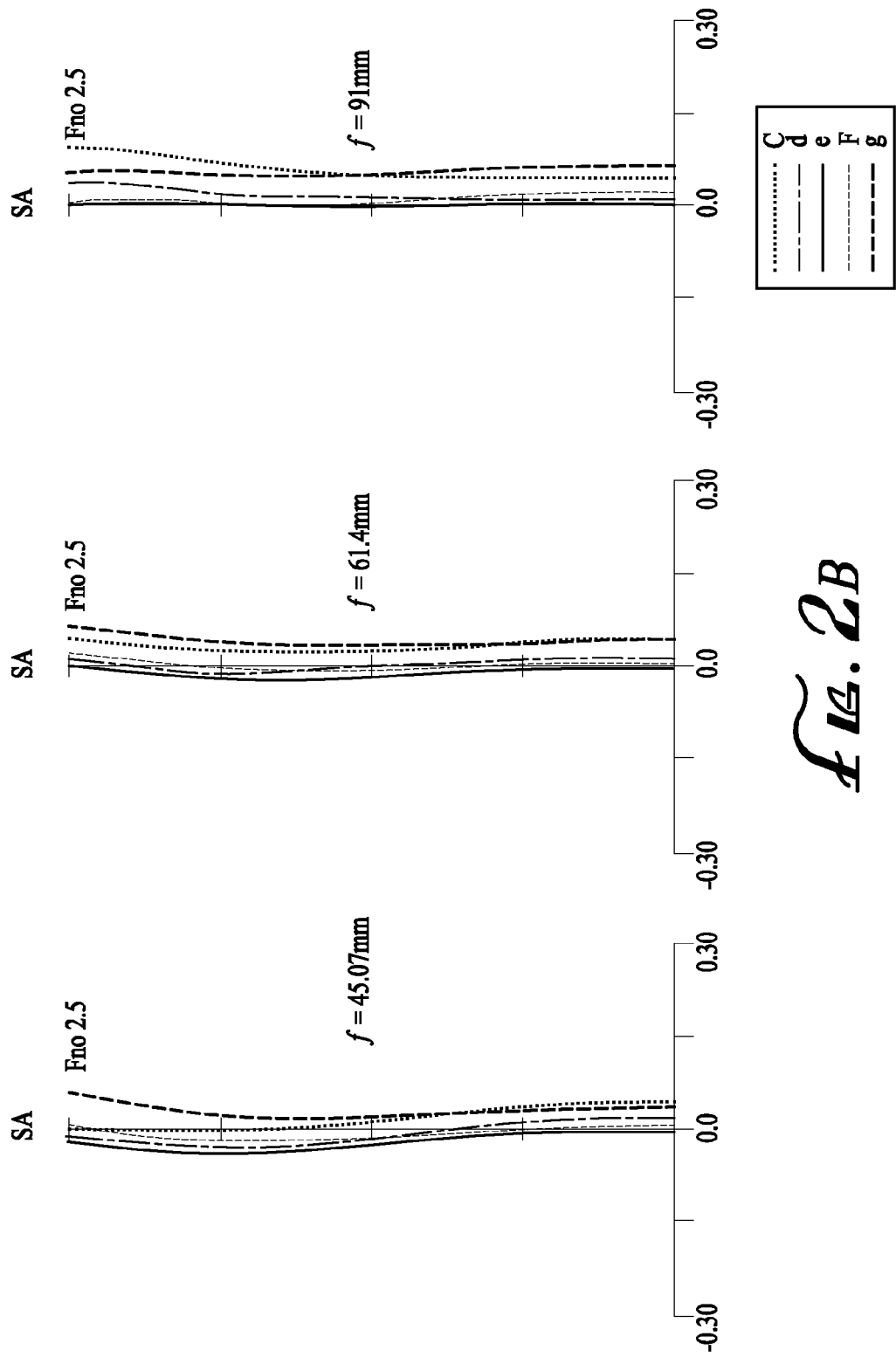
FIGS. 2B-2D illustrate aberration graphs of the first embodiment.
Figure 2C:
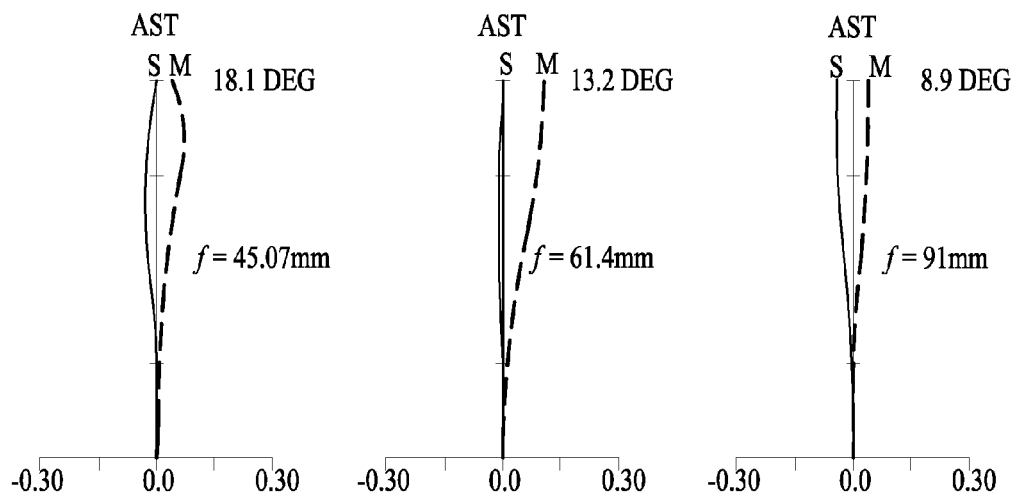
Figure 2D:
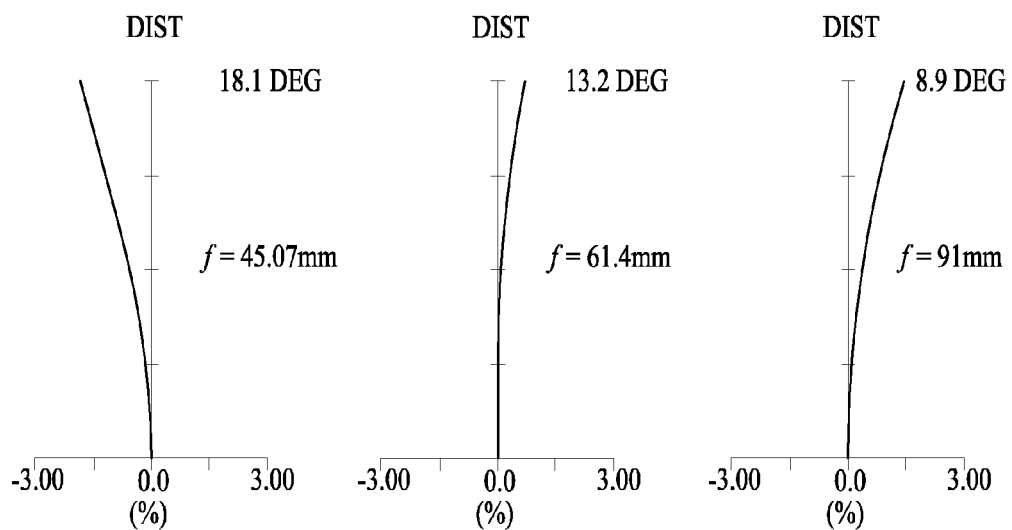

FIGS. 2B-2D illustrate aberration graphs of the first embodiment. The object distance is infinity for all FIGS. 2B-2D. According to different focal lengths, FIGS. 2B, 2C, and 2D respectively show spherical aberration at different spectral lines, astigmatism, and distortion.

Focus Movement Plans I-III for the First Embodiment

Figure 2E:
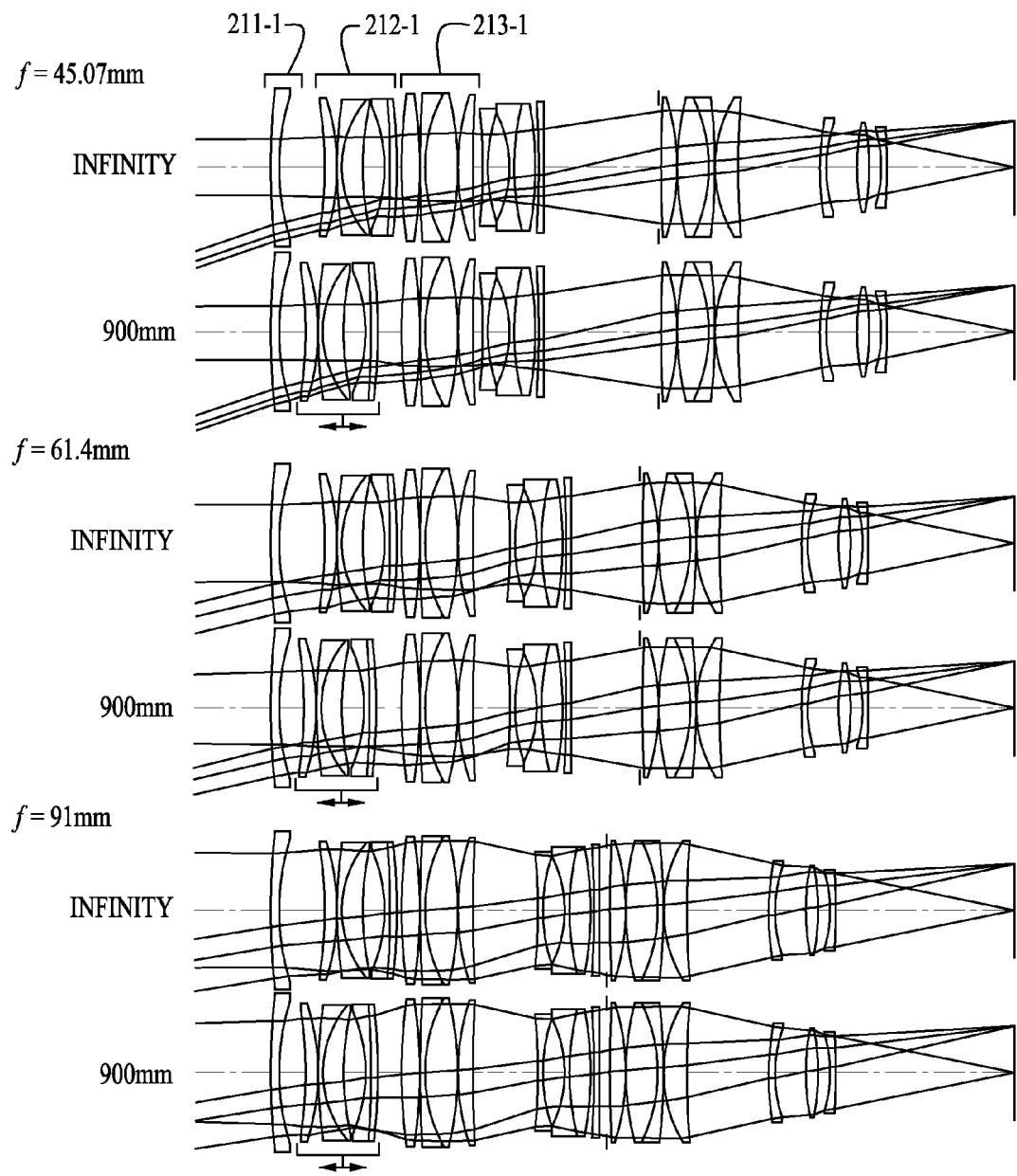
FIG. 2E illustrates the first embodiment with a first focus movement plan.
Figure 2F:
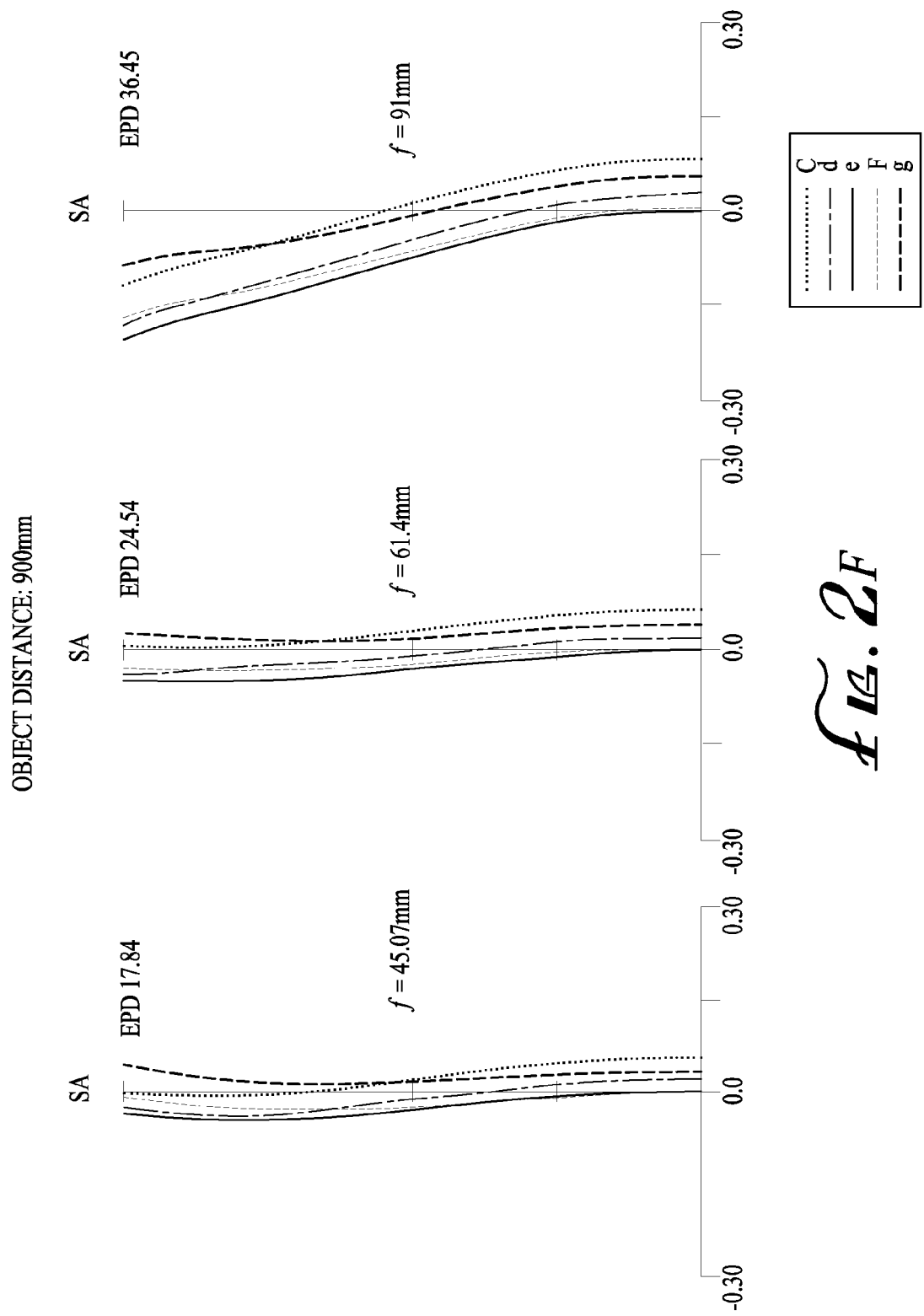
FIGS. 2F-2H illustrate aberration graphs of the first embodiment with the first focus movement plan.
Figure 2G:
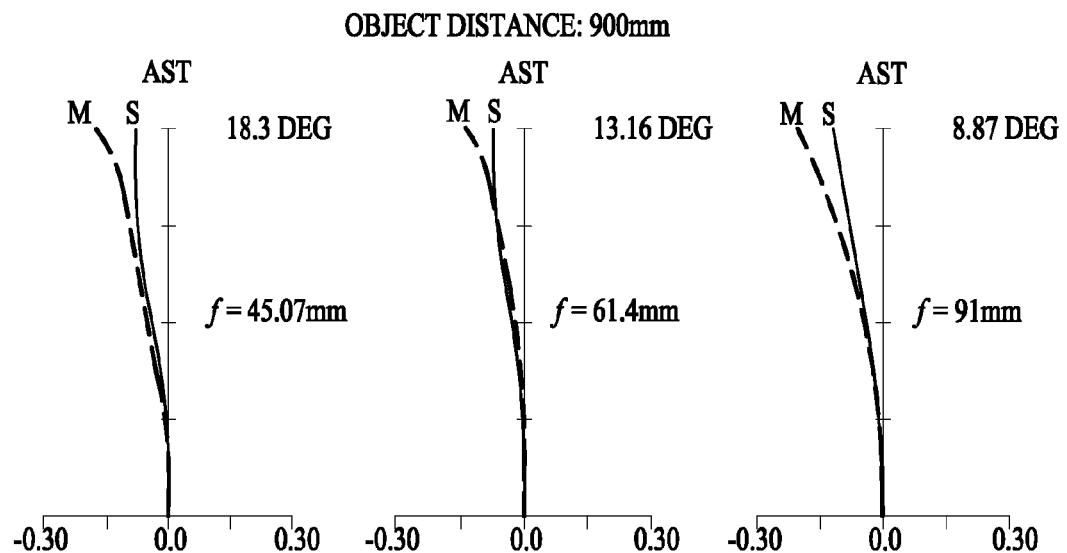
Figure 2H:
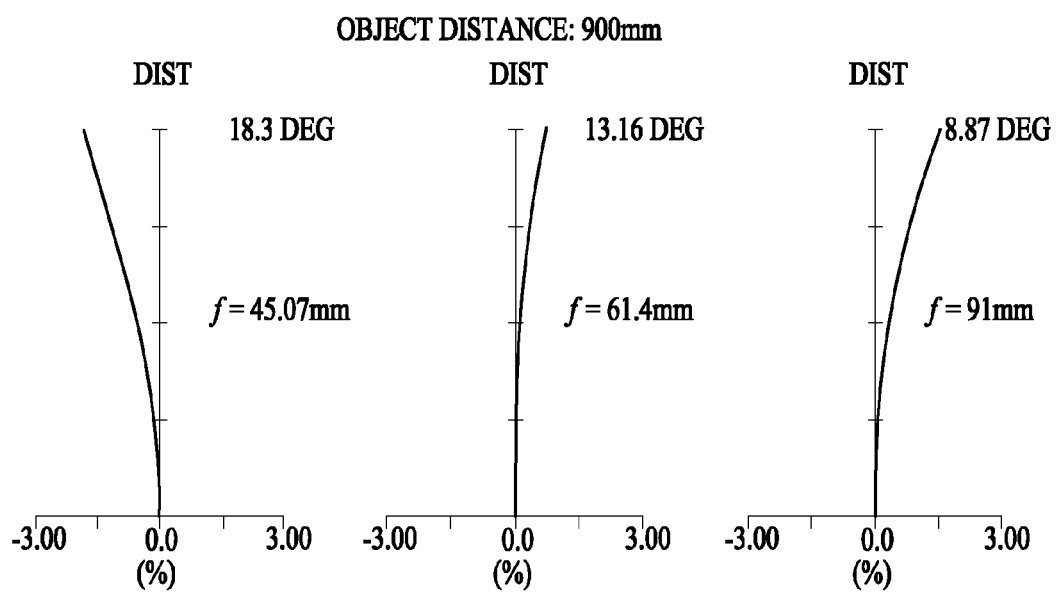
Figure 2I:
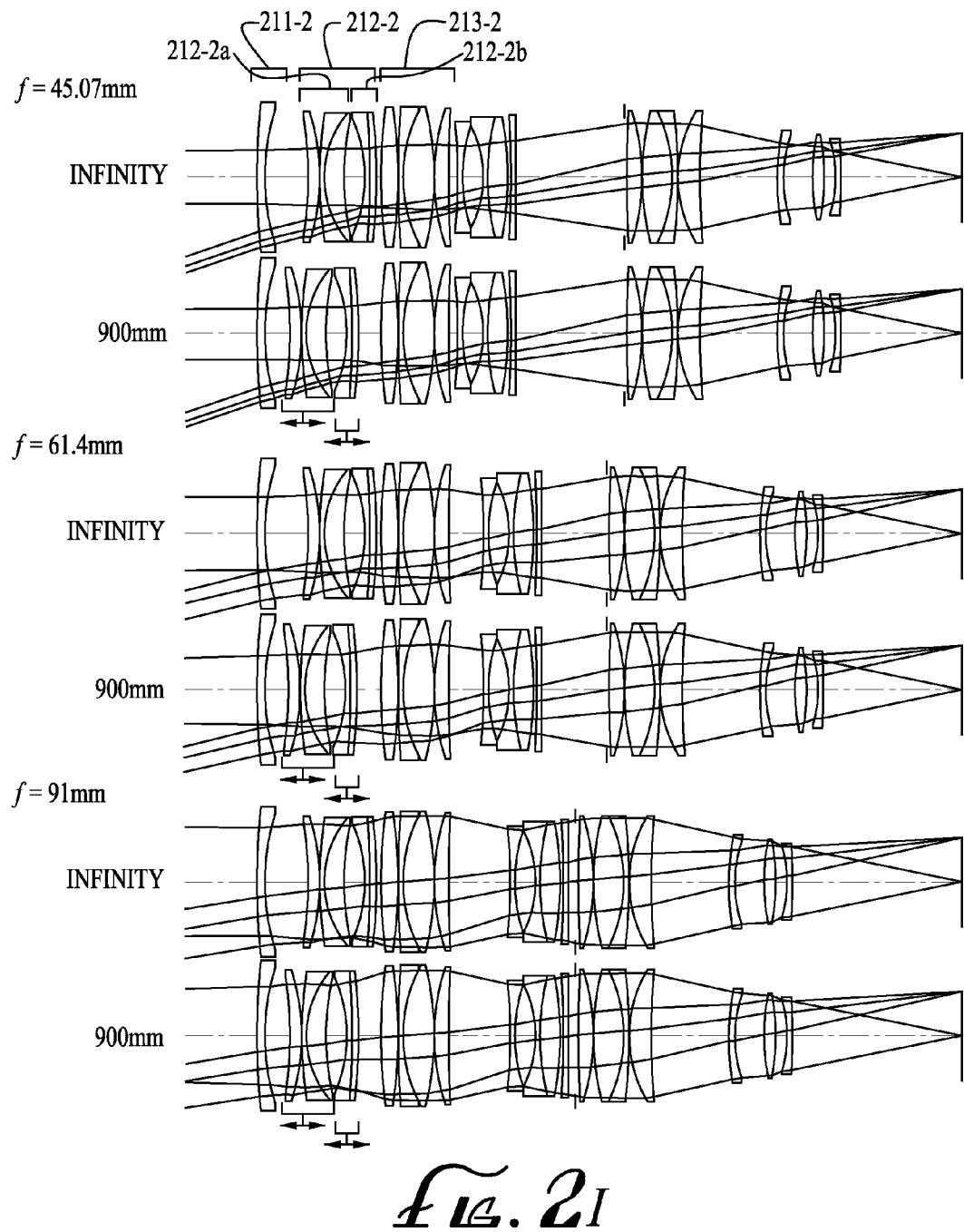
FIG. 2I illustrates the first embodiment with a second focus movement plan.
Figure 2J:
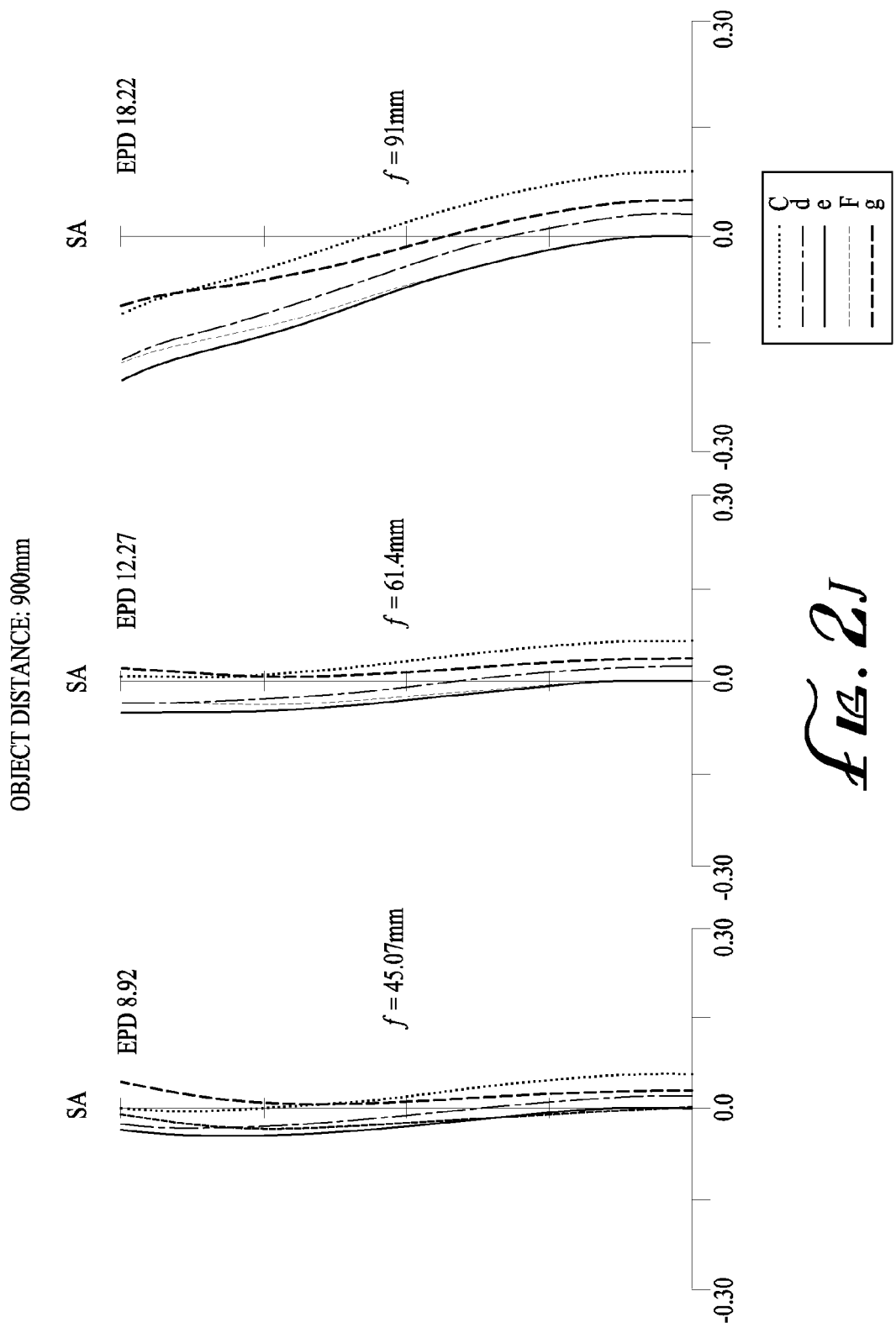
FIGS. 2J-2L illustrate aberration graphs of the first embodiment with the second focus movement plan.
Figure 2K:
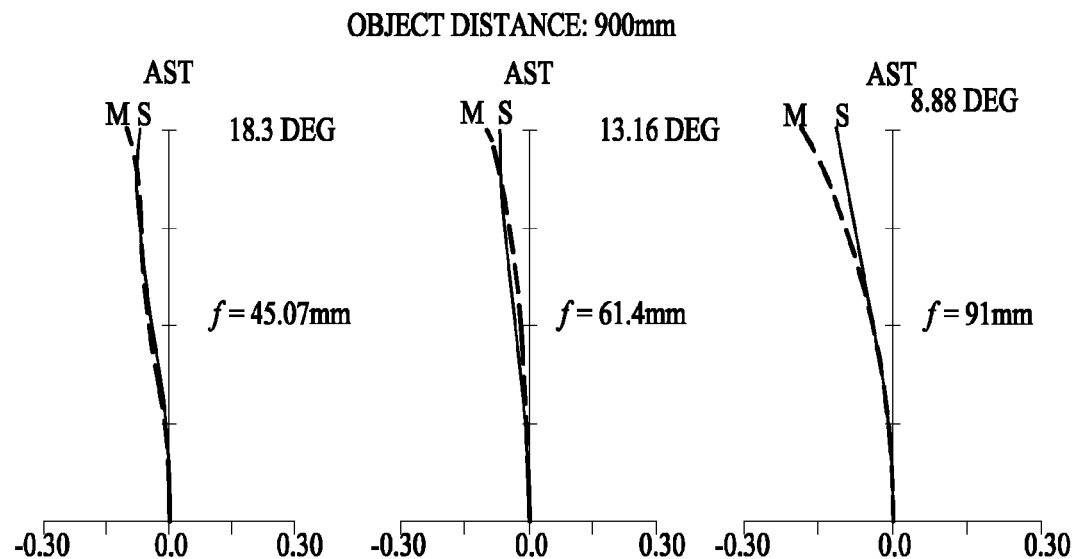
Figure 2L:
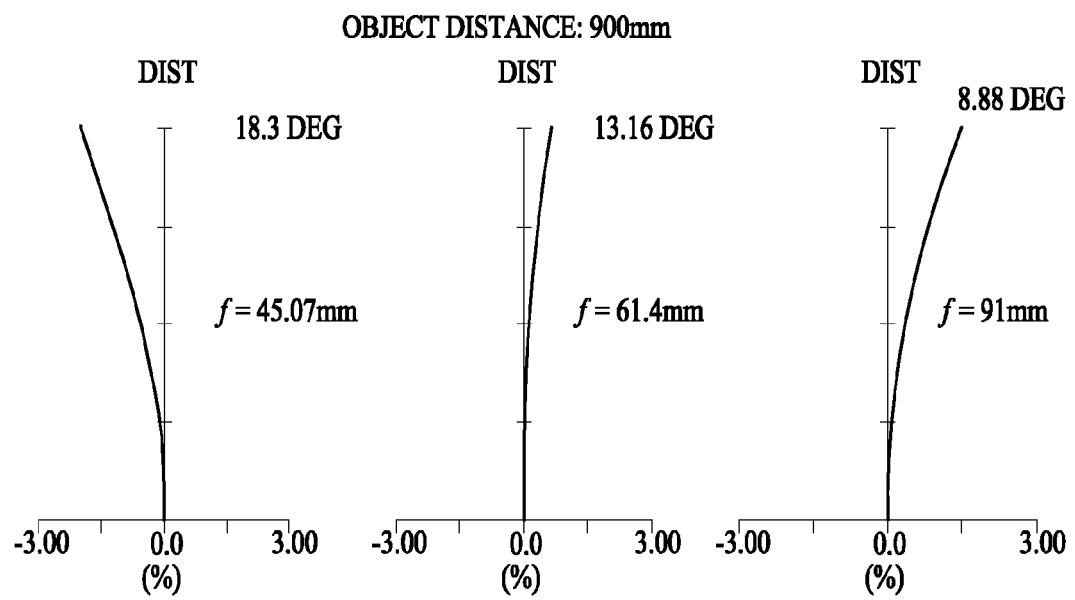
Figure 2M:
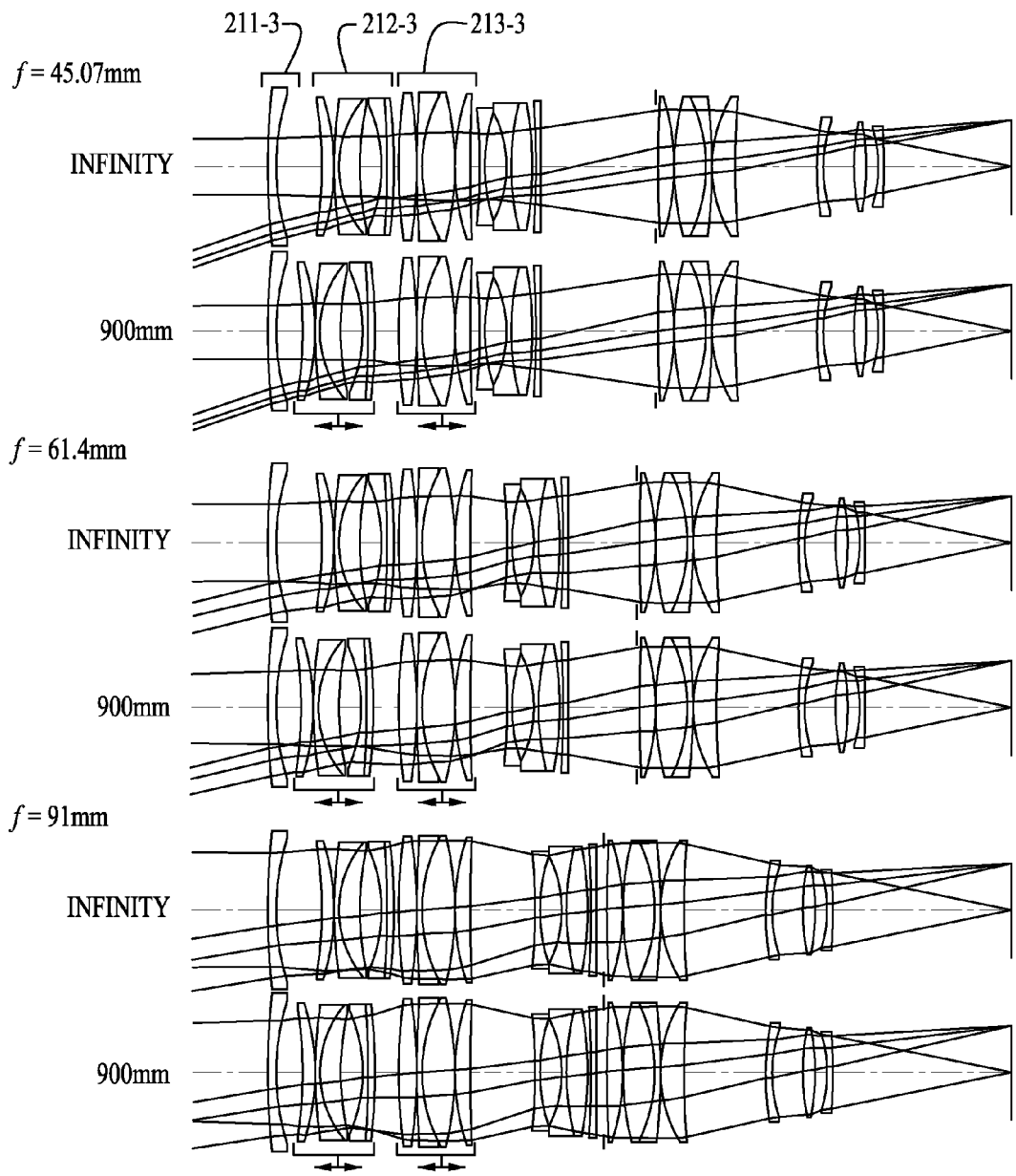
FIG. 2M illustrates the first embodiment with a third focus movement plan.

The first embodiment may employ any of focus movement plans I-III for lens group 210, as shown in the diagrams of FIGS. 2E, 2I, and 2M. Similar reference numbers in FIGS.

2E, 2I, 2M, and 1B refer to similar items. Aberration graphs indicate the effects of some optical aberrations. In order to represent operation and performance throughout the zoom range, the diagrams and graphs are provided in accordance with the wide-end zoom position, an intermediate zoom position, and the telephoto-end zoom position at the respective focal lengths (mm): 45.07, 61.4, and 91.

FIG. 2E illustrates the first embodiment with focus movement plan I. During progression from the end focus position of object distance at infinity to the other end focus position of minimum object distance at 900 mm, lens subgroup 212-1 may move monotonically toward the object side. The total travel distance of lens subgroup 212-1 may be 5.79 mm. This movement plan may apply to all zoom positions, as represented by the three different focal lengths.

FIGS. 2F-2H illustrate aberration graphs of the first embodiment with focus movement plan I. The object distance is the minimum object distance of 900 mm for all FIGS. 2F-2H. According to different focal lengths, FIGS. 2F, 2G, and 2H respectively show spherical aberration at different spectral lines, astigmatism, and distortion.

FIG. 2I illustrates the first embodiment with focus movement plan II. During progression from the end focus position of object distance at infinity to the other end focus position of minimum object distance at 900 mm, both lens subgroup parts 212-2a and 212-2b may move monotonically toward the object side. As both parts move toward the object side, the movement rate of the two parts may be different. The total travel distance of part 212-2b may be 5.234 mm. The total travel distance of part 212-2a may be 4.375 mm. Thus, part 212-2a may travel "faster" than part 212-2b. The combined power of the two parts may be negative. This movement plan may apply to all zoom positions, as represented by the three different focal lengths.

FIGS. 2J-2L illustrate aberration graphs of the first embodiment with focus movement plan II. The object distance is the minimum object distance of 900 mm for all FIGS. 2J-2L. According to different focal lengths, FIGS. 2J, 2K, and 2L respectively show spherical aberration at different spectral lines, astigmatism, and distortion FIG. 2M illustrates the first embodiment with focus movement plan III. During progression from the end focus position of object distance at infinity to the other end focus position of minimum object distance at 900 mm, lens subgroups 212-3 and 213-3 may move in different directions; lens subgroup 212-3 may move monotonically toward the object side, and lens subgroup 213-3 may move monotonically toward the image side. The total travel distance of lens subgroup 212-3 may be 5.33 mm. The total travel distance of lens subgroup 213-3 may be 0.88 mm. This movement plan may apply to all zoom positions, as represented by the three different focal lengths.

Figure 2N:
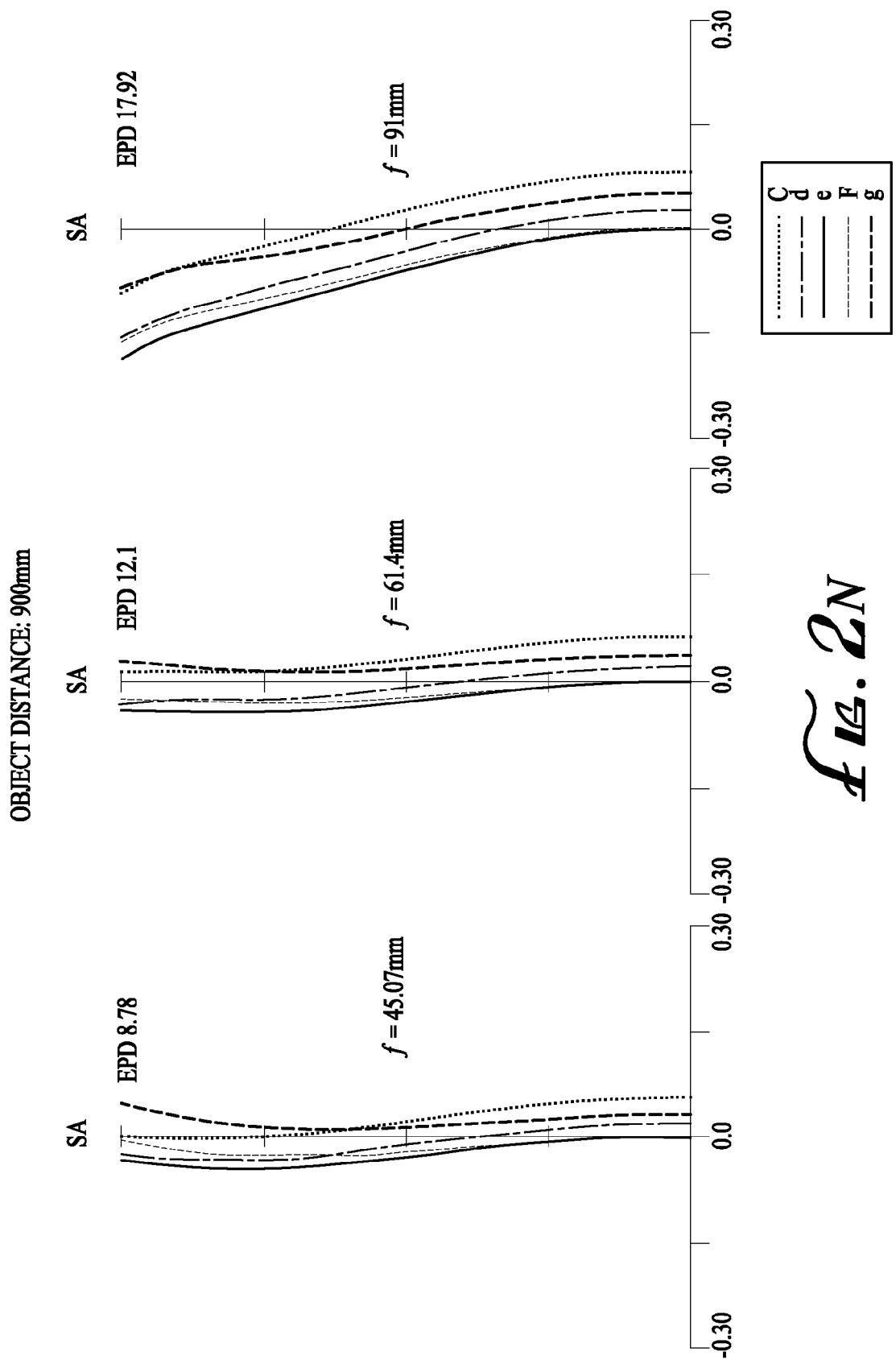
FIGS. 2N-2P illustrate aberration graphs of the first embodiment with the third focus movement plan.
Figure 2O:
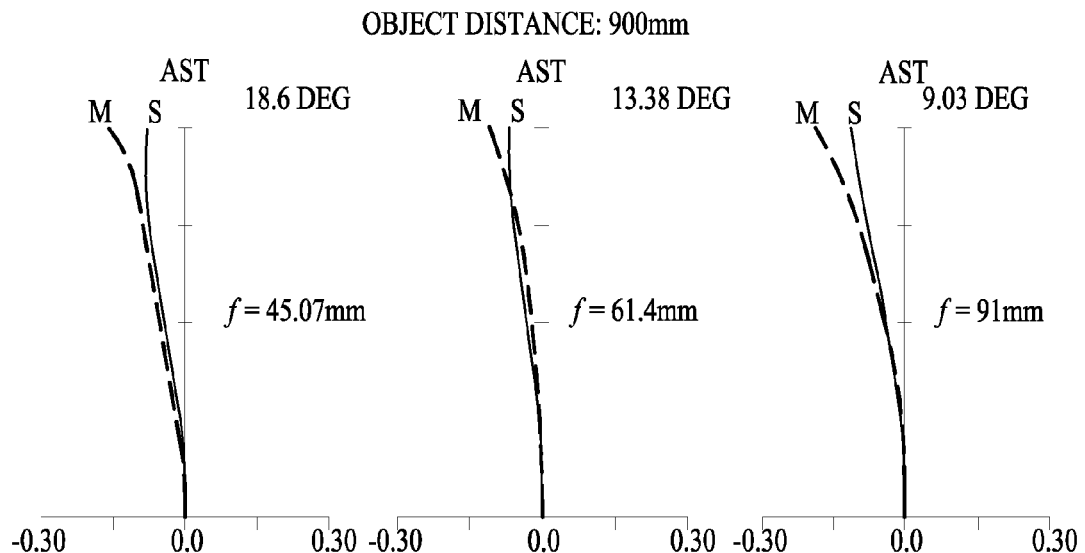
Figure 2P:
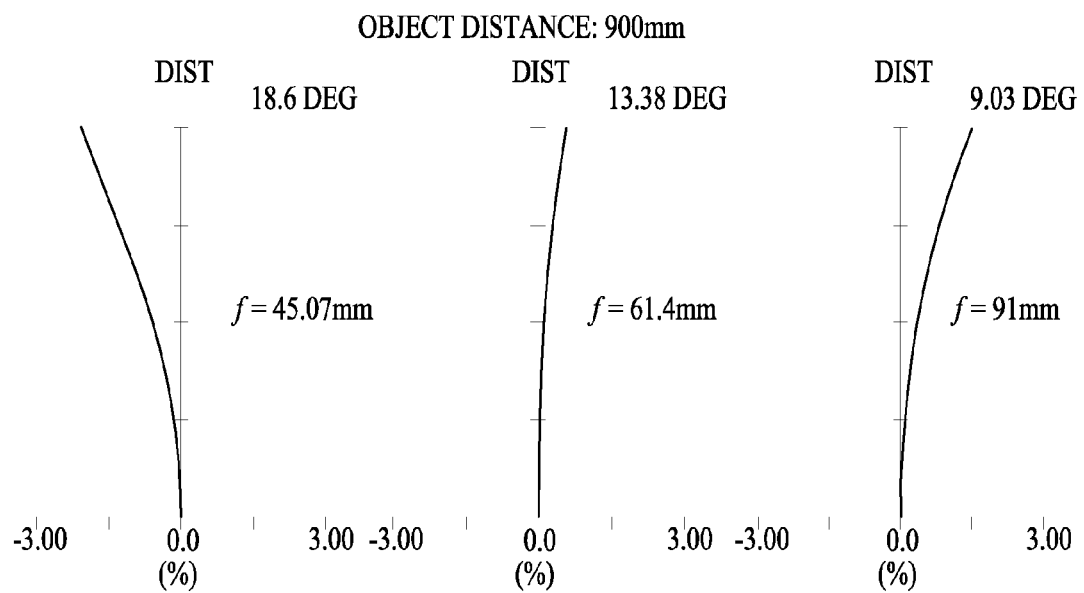

FIGS. 2N-2P illustrate aberration graphs of the first embodiment with focus movement plan III. The object distance is the minimum object distance of 900 mm for all FIGS. 2N-2P. According to different focal lengths, FIGS. 2N, 2O, and 2P respectively show spherical aberration at different spectral lines, astigmatism, and distortion.

Focus Breathing of the First Embodiment

TABLE 1C provides focus breathing values for each focus movement plan I-III for lens group 210 of FIGS. 2E, 2I, and 2M. For each focus movement plan, TABLE 1C shows focus breathing values at the various zoom positions of the wide-end zoom position, an intermediate zoom position, and the telephoto-end zoom position at three respective focal lengths (mm): 45.07, 61.4, and 91.

TABLE 1C

FIRST EMBODIMENT - FOCUS BREATHING

| Focus Movement Plan | Wide-end (W) f = 45.07 mm Focus Breathing (%) | Intermediate f = 61.4 mm Focus Breathing (%) | Telephoto-end (T) f = 91 mm Focus Breathing (%) |
|---|---|---|---|
| I - FIG. 2E | 0.93 | −0.11 | −0.24 |
| II - FIG. 2I | 1.17 | 0.01 | 0.16 |
| III - FIG. 2M | 2.72 | 1.68 | 1.53 |

The focus breathing values are based on the equation:

$$\text{Focus breathing } (\%) = (W_{inf} - W_{min})/W_{inf}$$

$W_{inf}$ is field of view at infinity. $W_{min}$ is field of view at minimum object distance=900 mm. TABLE 1C shows that the first embodiment achieves 5% or less (positive or negative) focus breathing over the entire zoom range for all three focus movement plans I-III of FIGS. 2E, 2I, and 2M. Lens element movement in lens group 210 and lens element power in the lens group 210 may contribute to provide this low focus breathing. Details of lens element movement in lens group 210 are described above in relation to FIGS. 2E, 2I, and 2M. Based on the lens data of TABLE 1A, a lens designer would know how to calculate the optical power of lens elements in lens group 210.

Example Second Embodiment

Figure 3A:
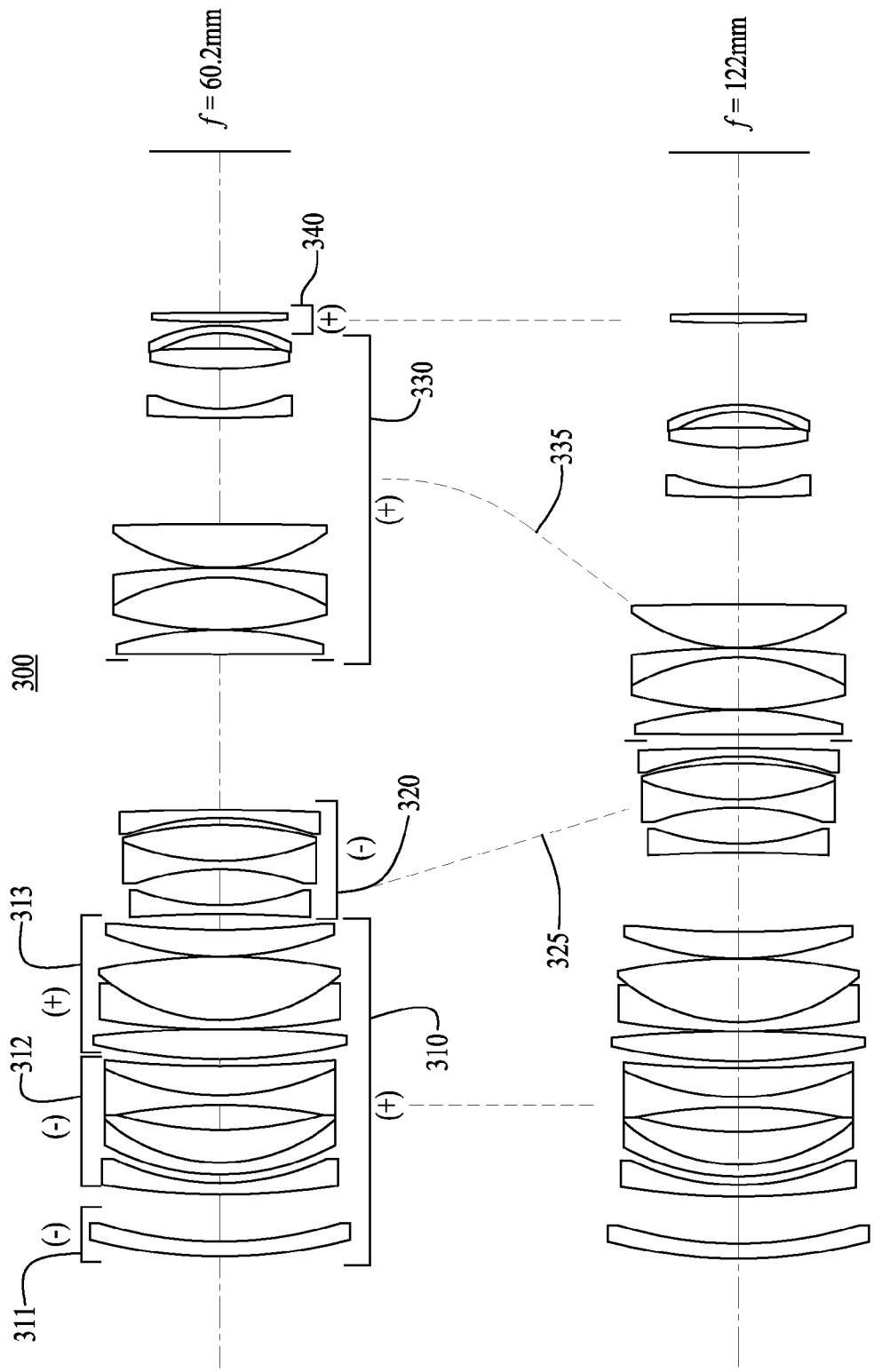
FIG. 3A illustrates a second embodiment.

FIG. 3A illustrates a second embodiment 300. From the wide-end (W) to the telephoto-end (T), the focal length ranges from 60.2 mm to 122 mm. The F-number is F/2.55. FIG. 3A shows four lens groups 310, 320, 330, and 340 with a PNPP power sequence. Lens group 310 includes three lens subgroups 311, 312, and 313 with a NNP power sequence. Lens groups 310 and 340 may be stationary. Movement plan lines 325 and 335 indicate the general movement plan for zoom functions in the second embodiment. Similar reference numbers in FIGS. 3A and 1A refer to similar items.

TABLE 2A provides lens data for the second embodiment. TABLE 2B provides the various zoom positions of the wide-end zoom position, an intermediate zoom position, and the telephoto-end zoom position at three respective focal lengths (mm): 60.2, 82.4, and 122.

TABLE 2A

SECOND EMBODIMENT - LENS DATA

| Surface | Radius of Curvature (mm) | Thickness or Separation (mm) | Ne | Ve |
|---|---|---|---|---|
| 1: | 124.00989 | 3.600000 | 1.48915 | 70.10 |
| 2: | 97.91684 | 11.521779 | | |
| 3: | 174.82077 | 2.870000 | 1.69417 | 30.84 |
| 4: | 58.50774 | 2.070000 | | |
| 5: | 57.78757 | 2.780000 | 1.85650 | 31.93 |
| 6: | 41.43454 | 8.070000 | 1.85504 | 23.64 |
| 7: | 92.86536 | 6.070000 | | |
| 8: | −134.67041 | 2.300000 | 1.80642 | 34.70 |
| 9: | 62.46630 | 7.250000 | 1.81265 | 25.24 |
| 10: | 292.63351 | 1.770000 | | |
| 11: | 152.45084 | 6.850000 | 1.83945 | 42.50 |
| 12: | −310.50003 | 0.200000 | | |
| 13: | 185.61521 | 2.070000 | 1.81265 | 25.24 |
| 14: | 44.72770 | 15.500000 | 1.69401 | 54.60 |
| 15: | −134.85578 | 0.150000 | | |
| 16: | 77.87823 | 6.200000 | 1.62033 | 63.00 |
| 17: | 268.46425 | D(17) | | |
| 18: | INFINITY | 1.270000 | | |
| 19: | −228.28379 | 2.070000 | 1.80642 | 34.70 |

TABLE 2A-continued

SECOND EMBODIMENT - LENS DATA

| Surface | Radius of Curvature (mm) | Thickness or Separation (mm) | Ne | Ve |
|---|---|---|---|---|
| 20: | 55.00841 | 8.777000 | | |
| 21: | −58.77152 | 2.020000 | 1.60520 | 65.10 |
| 22: | 62.16295 | 8.870000 | 1.85504 | 23.64 |
| 23: | −84.66376 | 1.500000 | | |
| 24: | −64.96424 | 2.000000 | 1.74341 | 32.03 |
| 25: | −426.37180 | 0.140534 | | |
| 26: | INFINITY | D(26) | | |
| STO: | INFINITY | 1.800000 | | |
| 28: | −2051.32770 | 5.770000 | 1.62247 | 63.19 |
| 29: | −94.83140 | 0.180000 | | |
| 30: | 98.32415 | 12.570000 | 1.49845 | 81.00 |
| 31: | −52.97465 | 2.190000 | 1.80642 | 34.70 |
| 32: | −229.41721 | 0.185000 | | |
| 33: | 44.00661 | 10.670000 | 1.49845 | 81.00 |
| 34: | −781.33500 | 25.647000 | | |
| 35: | 317.54697 | 2.270000 | 1.72733 | 29.00 |
| 36: | 41.18920 | 9.570000 | | |
| 37: | 76.84985 | 4.900000 | 1.85650 | 31.93 |
| 38: | −270.68849 | 3.890000 | | |
| 39: | −29.43401 | 1.800000 | 1.82017 | 46.40 |
| 40: | −38.87067 | D(40) | | |
| 41: | 397.37249 | 2.250000 | 1.48915 | 70.10 |
| 42: | −757.85293 | | | |

TABLE 2B

SECOND EMBODIMENT - ZOOM POSITIONS

| Location | Wide-end (W) f = 60.2 mm Separation (mm) | Intermediate f = 82.4 mm Separation (mm) | Telephoto-end (T) f = 122 mm Separation (mm) |
|---|---|---|---|
| D(17) | 2.55000 | 10.38410 | 17.84915 |
| D(26) | 36.46166 | 21.33113 | 2.15300 |
| D(40) | 1.00000 | 8.29644 | 20.00951 |

Figure 3B:
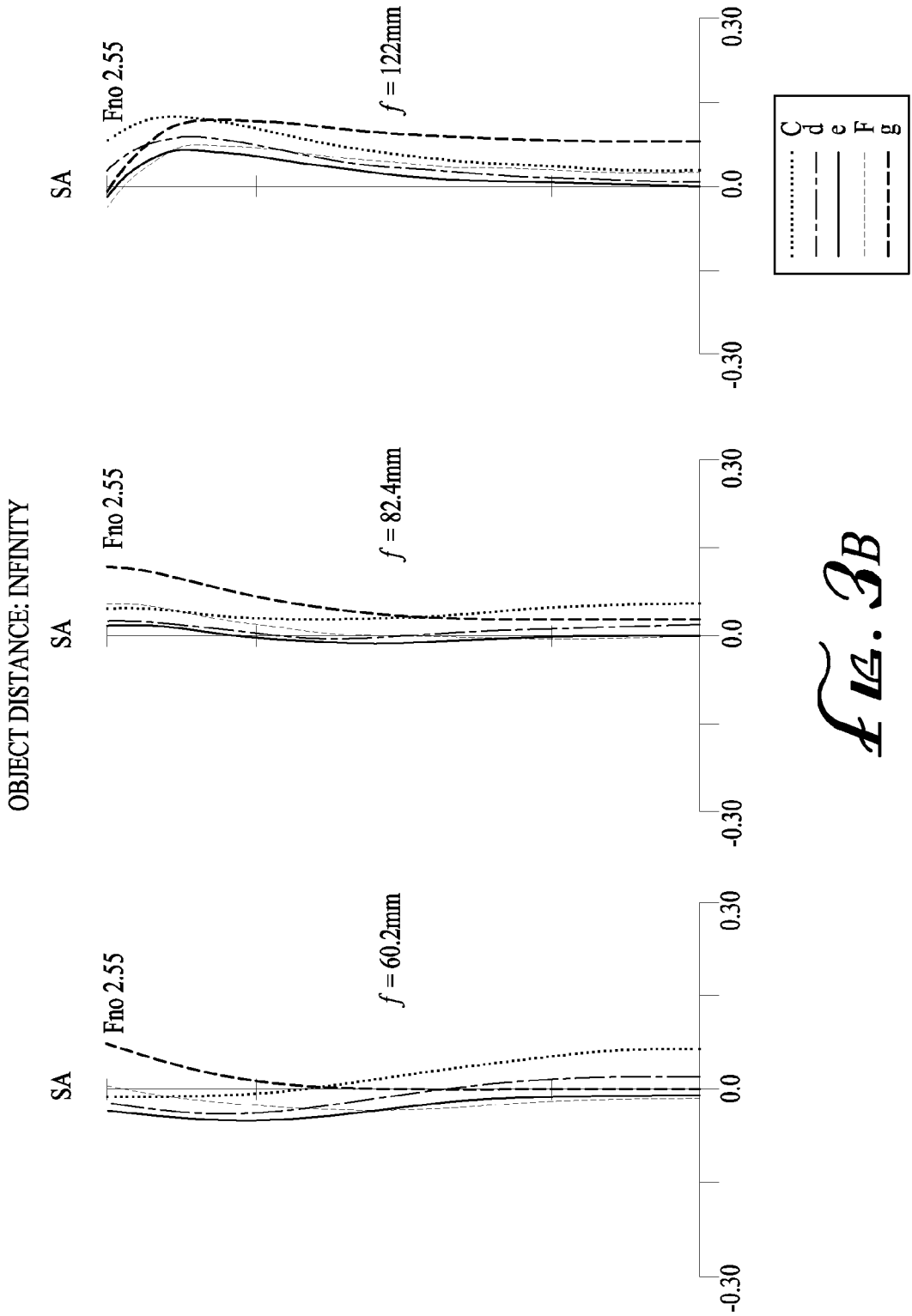
FIGS. 3B-3D illustrate aberration graphs of the second embodiment.
Figure 3C:
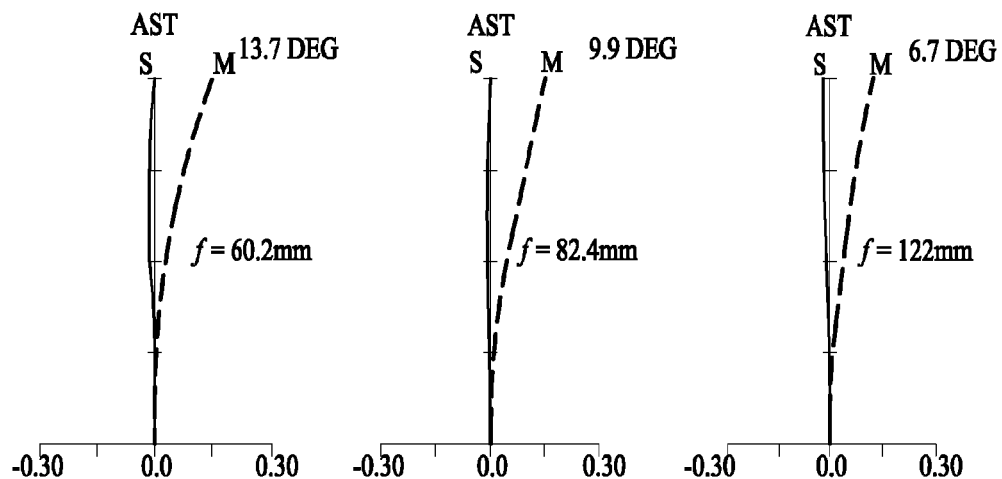
Figure 3D:
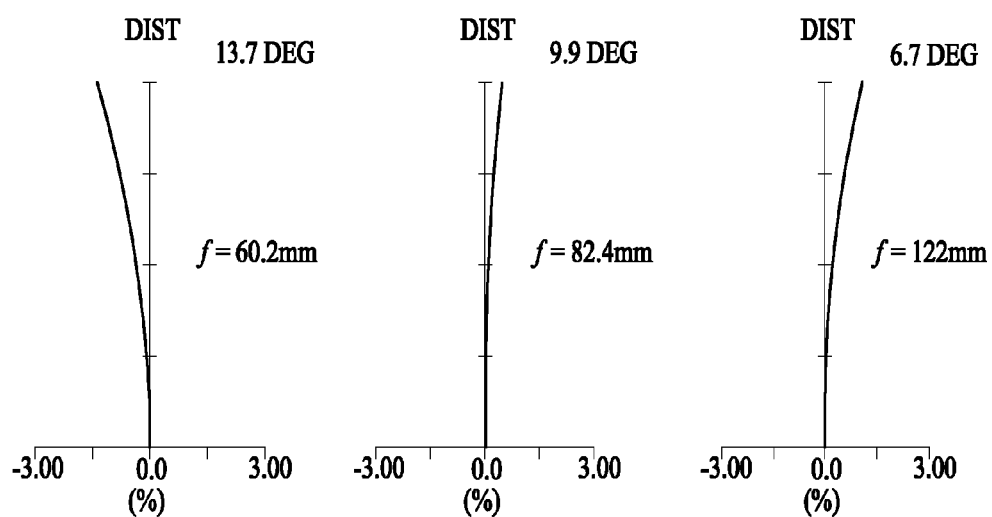

FIGS. 3B-3D illustrate aberration graphs of the second embodiment. The object distance is infinity for all FIGS. 3B-3D. According to different focal lengths, FIGS. 3B, 3C, and 3D respectively show spherical aberration at different spectral lines, astigmatism, and distortion.

Similar to the first embodiment, the second embodiment may employ any of focus movement plans I-III for lens group 310. The operating principles exemplified above for the first embodiment with focus movement plans I-III may be applied to the second embodiment with focus movement plans I-III.

Example Third Embodiment

Figure 4A:
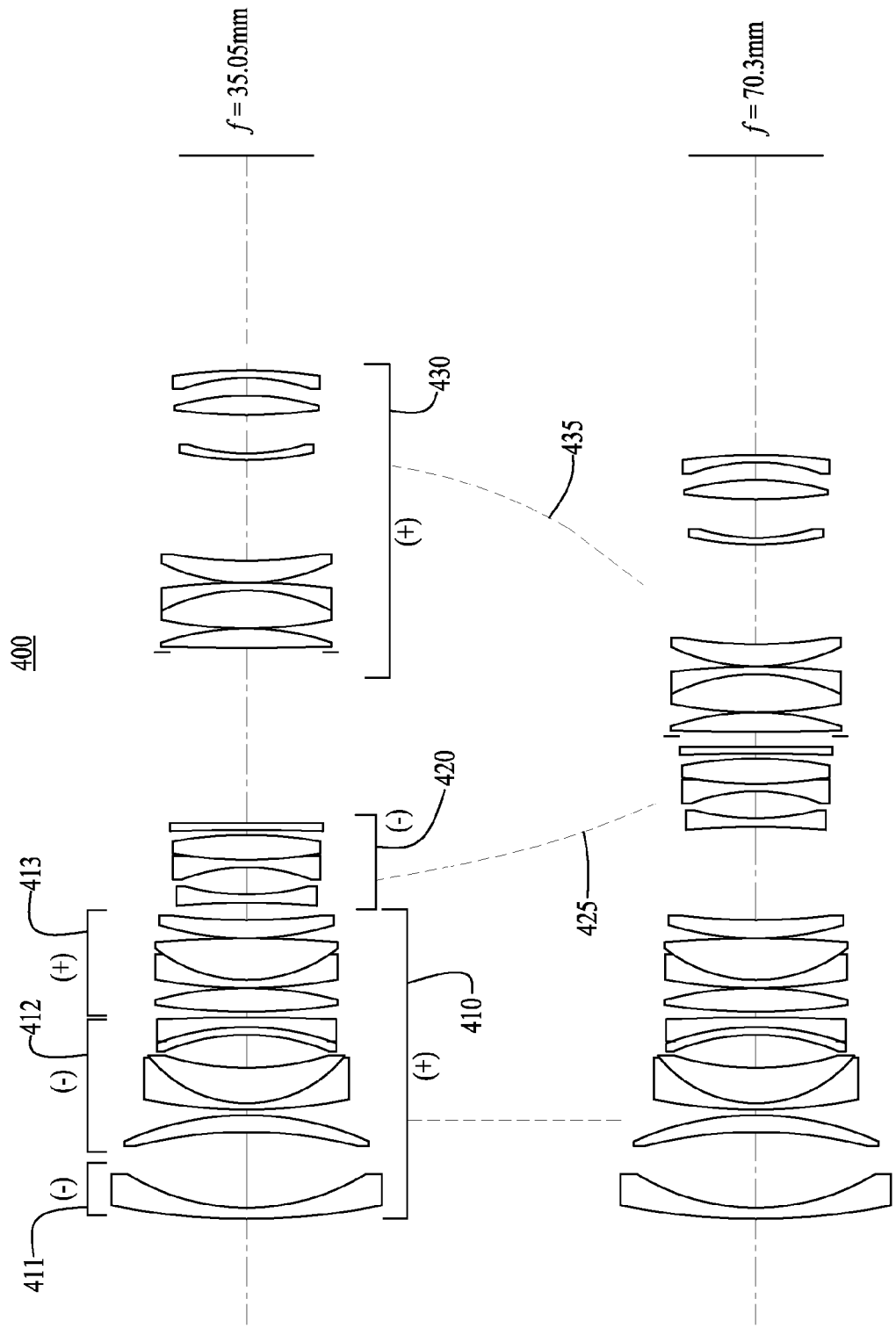
FIG. 4A illustrates a third embodiment.

FIG. 4A illustrates a third embodiment 400. From the wide-end (W) to the telephoto-end (T), the focal length ranges from 35.05 mm to 70.3 mm. The F-number is F/2.50. FIG. 4A shows three lens groups 410, 420, and 430 with a PNP power sequence. Lens group 410 includes three lens subgroups 411, 412, and 413 with a NNP power sequence. Lens groups 410 may be stationary. Movement plan lines 425 and 435 indicate the general movement plan for zoom functions in the third embodiment. Similar reference numbers in FIGS. 4A and 1A refer to similar items.

TABLE 3A provides lens data for the third embodiment. TABLE 3B provides the various zoom positions of the wide-end zoom position, an intermediate zoom position, and the telephoto-end zoom position at three respective focal lengths (mm): 35.05, 47.6, and 70.3.

TABLE 3A

THIRD EMBODIMENT - LENS DATA

| Surface | Radius of Curvature (mm) | Thickness or Separation (mm) | Ne | Ve |
|---|---|---|---|---|
| 1: | 144.30739 | 2.100000 | 1.48915 | 70.10 |
| 2: | 44.95907 | 14.700000 | | |
| 3: | −101.79557 | 3.477000 | 1.85504 | 23.64 |
| 4: | −60.07309 | 1.070000 | | |
| 5: | 106.06539 | 1.250000 | 1.77621 | 49.30 |
| 6: | 25.21041 | 6.930000 | 1.85504 | 23.64 |
| 7: | 55.59505 | 6.549983 | | |
| 8: | −39.84672 | 1.350000 | 1.84106 | 36.80 |
| 9: | −53.45983 | 1.920000 | 1.85504 | 23.64 |
| 10: | −300.04283 | 1.082732 | | |
| 11: | 126.31367 | 4.550000 | 1.80811 | 46.30 |
| 12: | −74.12813 | 0.200000 | | |
| 13: | 112.06933 | 1.500000 | 1.81266 | 25.16 |
| 14: | 29.93921 | 7.965813 | 1.69401 | 54.60 |
| 15: | −211.28724 | 0.200000 | | |
| 16: | 62.06183 | 3.557548 | 1.62033 | 63.00 |
| 17: | 179.49893 | D(17) | | |
| 18: | INFINITY | 0.734711 | | |
| 19: | −116.75407 | 1.500000 | 1.70557 | 41.00 |
| 20: | 51.00188 | 5.248929 | | |
| 21: | −35.55880 | 1.500000 | 1.60520 | 65.10 |
| 22: | 95.94345 | 5.026969 | 1.85500 | 23.69 |
| 23: | −79.51999 | 0.955000 | | |
| 24: | −215.30935 | 1.400000 | 1.81266 | 25.16 |
| 25: | −1415.89104 | D(25) | | |
| STO: | INFINITY | 0.773380 | | |
| 27: | 1170.99064 | 3.870000 | 1.49845 | 81.00 |
| 28: | −51.65884 | 0.137000 | | |
| 29: | 109.27259 | 7.300000 | 1.49845 | 81.00 |
| 30: | −36.65351 | 1.500000 | 1.80642 | 34.70 |
| 31: | −140.09290 | 0.147000 | | |
| 32: | 40.52229 | 4.300000 | 1.49845 | 81.00 |
| 33: | 101.45312 | 19.700000 | | |
| 34: | 73.60271 | 1.350000 | 1.72310 | 29.30 |
| 35: | 41.46158 | 7.392000 | | |
| 36: | 128.02039 | 3.800000 | 1.88815 | 40.50 |
| 37: | −48.22778 | 3.601119 | | |
| 38: | −36.88838 | 1.375000 | 1.82017 | 46.40 |
| 39: | −98.09400 | | | |

TABLE 3B

THIRD EMBODIMENT - ZOOM POSITIONS

| Location | Wide-end (W) f = 35.05 mm Separation (mm) | Intermediate f = 47.6 mm Separation (mm) | Telephoto-end (T) f = 70.3 mm Separation (mm) |
|---|---|---|---|
| D(17) | 2.66886 | 11.27000 | 17.98887 |
| D(25) | 33.79186 | 19.70349 | 2.03943 |

Figure 4B:
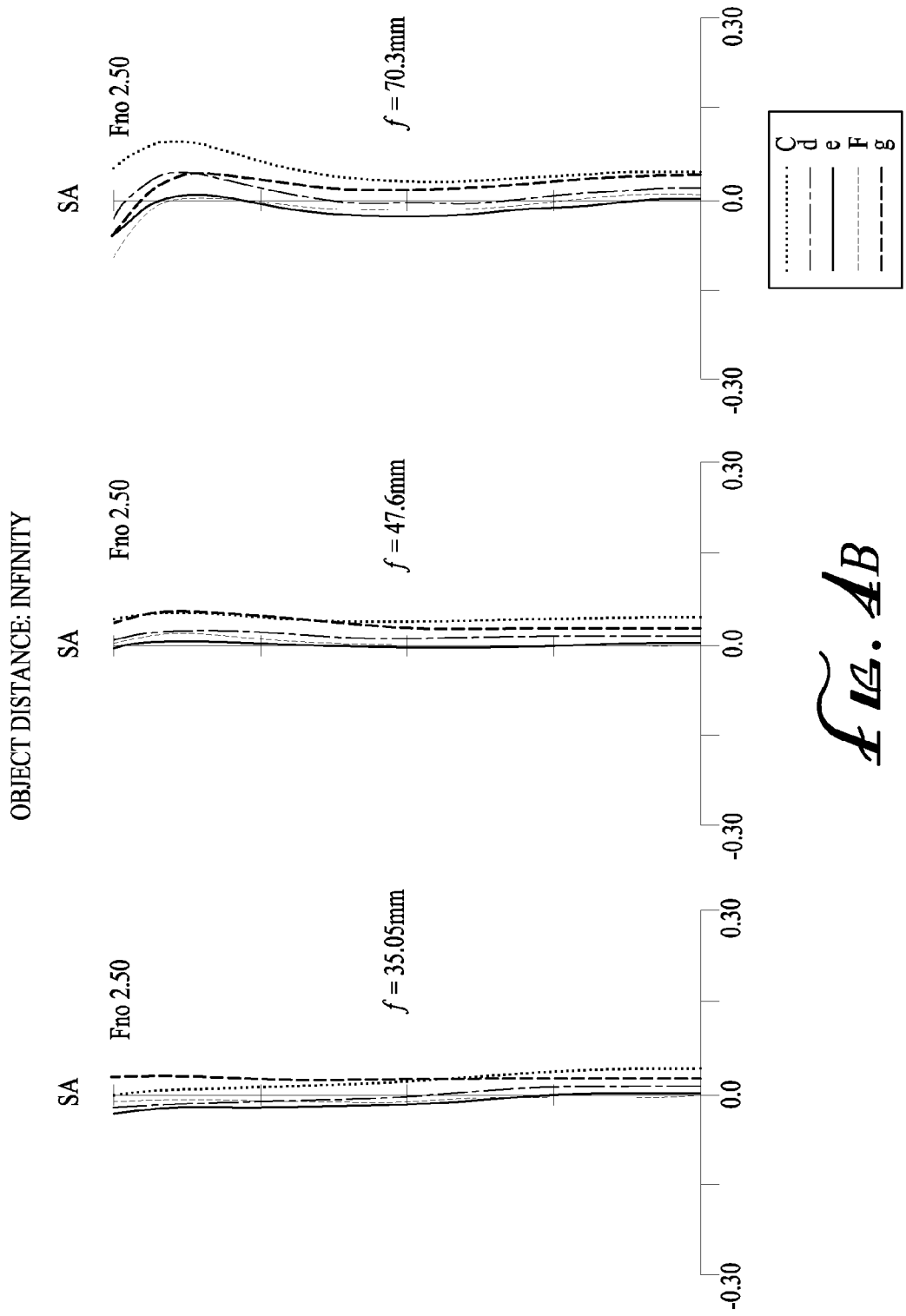
FIGS. 4B-4D illustrate aberration graphs of the third embodiment.
Figure 4C:
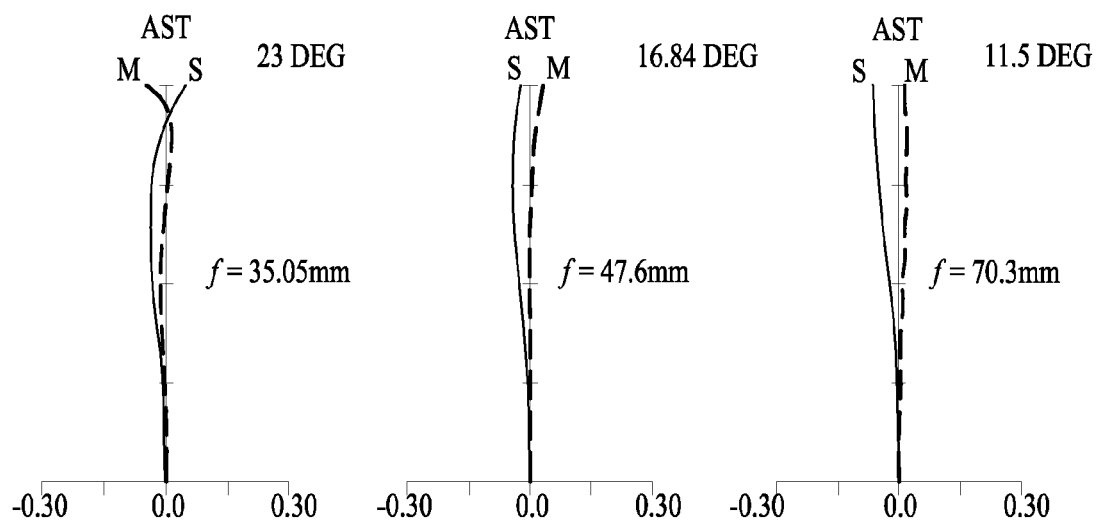
Figure 4D:
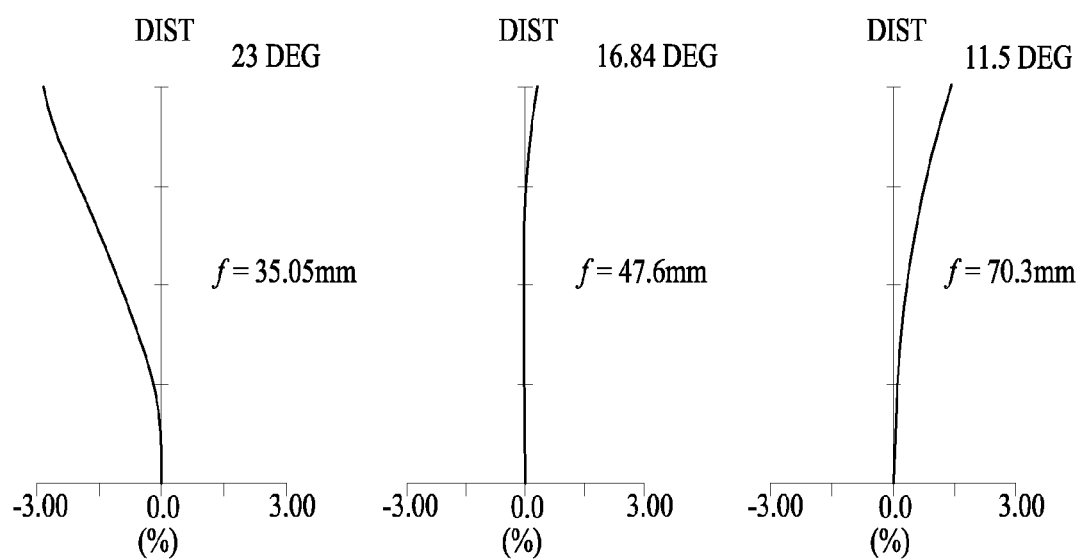

FIGS. 4B-4D illustrate aberration graphs of the third embodiment. The object distance is infinity for all FIGS. 4B-4D. According to different focal lengths, FIGS. 4B, 4C, and 4D respectively show spherical aberration at different spectral lines, astigmatism and distortion.

Similar to the first embodiment, the third embodiment may employ any of focus movement plans I-III for lens group 410. The operating principles exemplified above for the first embodiment with focus movement plans I-III may be applied to the third embodiment with focus movement plans I-III.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A zoom lens system for forming an image of an object, said system having an object side and an image side, said system comprising in order from the object side to the image side:
   a first lens group with positive power, the first lens group including:
      a first lens subgroup with negative power and being stationary,
      a second lens subgroup with negative power and including a lens element being movable to vary focus of the image, and
      a third lens subgroup with positive power;
   a second lens group with negative power; and
   a third lens group with positive power;
   wherein the second and third lens groups are movable to vary magnification of the image during zoom.

2. The system of claim 1 further comprising:
   a fourth lens group to flatten the image.

3. The system of claim 1, the third lens subgroup being stationary.

4. The system of claim 3, the second lens subgroup including two parts, the two parts being movable at different rates of travel to vary focus of the image, and one of the two parts including said lens element.

5. The system of claim 1, the third lens subgroup being movable to vary focus of the image.

6. The system of claim 1, lens elements of the first lens group being movable according to a plurality of focus movement plans.

7. The system of claim 1, the second lens subgroup including two cemented doublets.

8. The system of claim 1, the third lens subgroup including, in any order, a positive lens element and a cemented doublet.

9. The system of claim 1, the second lens group including, in any order, a negative lens element and a cemented doublet.

10. The system of claim 1, the third lens group including an iris stop and including, in order from the object side to the image side, a lens subgroup with positive power and a lens subgroup with negative power.

11. The system of claim 10, the lens subgroup with positive power of the third lens group including, in any order, a positive lens element and a cemented doublet, and the lens subgroup with negative power of the third lens group including, in any order, a negative lens element and a positive lens element.

12. The system of claim 1 having a zoom range, wherein lens element movement in the first lens group and lens element power in the first lens group contribute to provide 5% or less focus breathing over the entire zoom range of the system.

13. The system of claim 1 having an F-number of F/2.8 or less.

14. A zoom lens system having an object side and an image side, said system comprising in order from the object side to the image side:
   a positive focus lens group A including:
      a stationary negative lens subgroup X,
      a negative lens subgroup Y including a movable lens element, and
      a positive lens subgroup Z;
   a negative zoom lens group B; and
   a positive zoom lens group C.

15. The system of claim 14 further comprising:
   a field flattener lens group D.

16. The system of claim 14, lens subgroup Z being stationary.

17. The system of claim 16, lens subgroup Y including two parts, the two parts being movable at different rates of travel, and one of the two parts including said movable lens element.

18. The system of claim 14, lens subgroup Z being movable.

19. The system of claim 14, lens elements of focus lens group A being movable according to a plurality of focus movement plans.

20. The system of claim 14, lens subgroup Y including two cemented doublets.

21. The system of claim 14, lens subgroup Z including, in any order, a positive lens element and a cemented doublet.

22. The system of claim 14, zoom lens group B including, in any order, a negative lens element and a cemented doublet.

23. The system of claim 14, zoom lens group C including an iris stop and including, in order from the object side to the image side, a lens subgroup with positive power and a lens subgroup with negative power.

24. The system of claim 23, the lens subgroup with positive power of zoom lens group C including, in any order, a positive lens element and a cemented doublet, and the lens subgroup with negative power of zoom lens group C including, in any order, a negative lens element and a positive lens element.

25. The system of claim 14 having a zoom range, wherein lens element movement in focus lens group A and lens element power in focus lens group A contribute to provide 5% or less focus breathing over the entire zoom range of the system.

26. The system of claim 14 having an F-number of F/2.8 or less.

* * * * *